US010949691B2

(12) United States Patent
Hara

(10) Patent No.: US 10,949,691 B2
(45) Date of Patent: Mar. 16, 2021

(54) INFORMATION PROCESSING SYSTEM PROVIDED WITH MOBILE TERMINAL THAT CAN PLAY BACK DATA WRITTEN ON PAGE

(71) Applicant: KYOCERA Document Solutions Inc., Osaka (JP)

(72) Inventor: Hiroyuki Hara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/531,456

(22) Filed: Aug. 5, 2019

(65) Prior Publication Data

US 2020/0050876 A1    Feb. 13, 2020

(30) Foreign Application Priority Data

Aug. 9, 2018  (JP) .............................. JP2018-150257
Aug. 9, 2018  (JP) .............................. JP2018-150258

(51) Int. Cl.
*G06K 9/00*      (2006.01)
*G06F 16/957*    (2019.01)
*G06F 16/958*    (2019.01)
*G06F 40/114*    (2020.01)
*G06F 40/171*    (2020.01)

(52) U.S. Cl.
CPC ..... *G06K 9/00852* (2013.01); *G06F 16/9574* (2019.01); *G06F 16/986* (2019.01); *G06F 40/114* (2020.01); *G06F 40/171* (2020.01)

(58) Field of Classification Search
CPC ...................... G06K 9/00852; G06F 116/9574
See application file for complete search history.

(56) References Cited

U.S. PATENT DOCUMENTS

2002/0174431 A1* 11/2002 Bowman ................ H04N 5/445
                                                        725/47
2015/0206446 A1*  7/2015 Gupta ...................... G09B 5/08
                                                        434/362

FOREIGN PATENT DOCUMENTS

JP         2013-223086 A      10/2013

* cited by examiner

*Primary Examiner* — Girumsew Wendmagegn
(74) *Attorney, Agent, or Firm* — IP Business Solutions, LLC

(57) ABSTRACT

A mobile terminal includes a display device that displays pages, and a control unit that acts as an input receiver that receives a writing made on the page, displayed on the display device, an application executor that executes an application program, a recording requester that requests a data management system to record playback data including the written data received by the input receiver and a task executed by the browser application program acquired by the browser expander, with a time stamp added to the written data and the executed task, and a playback processor that plays back the written data and the executed task included in the playback data acquired from the data management system, in synchronization according to the time stamp. The playback processor plays back the task executed by the browser application program, through the browser expander.

1 Claim, 22 Drawing Sheets

Fig.8A

```
JSON.stringify({
startTime:xxxx.yy.dd.hh.mm.ss,
endTime:xxxx.yy.dd.hh.mm.ss,
recordingTime:hh.mm.dd,
fileName:aaaa.wav
})
```
— 51, 52

```
JSON.stringify({
startTime:xxxx.yy.dd.hh.mm.ss,
endTime:xxxx.yy.dd.hh.mm.ss,
recordingTime:hh.mm.dd,
fileName:aaaa.SVG
})
```
— 54

```
JSON.stringify({
startTime:xxxx.yy.dd.hh.mm.ss,
endTime:xxxx.yy.dd.hh.mm.ss,
recordingTime:hh.mm.dd,
text:{
   fonttype:Gothic,
   siza:40px,
   string:"abcd",
   x:100,
   y:300
}
image:{
   fileName:image.jpg,
   x:200,
   y:400
}
link:{
   fonttype:Gothic,
   siza:40px,
   string:"abcd",
   x:100,
   y:300
   hrf:http://www.abcd
}
})
```
— 55

Fig.8B

```
JSON.stringify({
startTime:xxxx.yy.dd.hh.mm.ss,
endTime:xxxx.yy.dd.hh.mm.ss,
recordingTime:hh.mm.dd,
})
```
— 56

```
JSON.stringify({
startTime:xxxx.yy.dd.hh.mm.ss,
endTime:xxxx.yy.dd.hh.mm.ss,
recordingTime:hh.mm.dd,
appID:bbbb
eventID:cccc
inputdata:dddd
})
```
— 57

INFORMATION PROCESSING SYSTEM PROVIDED WITH MOBILE TERMINAL THAT CAN PLAY BACK DATA WRITTEN ON PAGE

INCORPORATION BY REFERENCE

This application claims priority to Japanese Patent Application No. 2018-150257, and No. 2018-150258 filed on Aug. 9, 2018, the entire contents of which are incorporated by reference herein.

BACKGROUND

The present disclosure relates to a mobile terminal configured to play back data written on a page, and an information processing system.

Recently, digitization of school classes is in progress. For example, a technique has been proposed that includes recording the voice of a teacher, or a picture of a content displayed by the teacher on a monitor of the classroom, as recorded information, and generating and recording synchronicity information of the content and the recorded information, at the timing that the page number of the content changes. With such a technique, the content and the recorded information can be played back in synchronization at the timing that the page number of the content changes, through a network.

SUMMARY

The disclosure proposes further improvements of the foregoing technique.

In an aspect, the disclosure provides a mobile terminal including a display device and a control unit. The display device displays pages. The control unit includes a CPU, and acts as an input receiver, an application executor, a browser expander, a recording requester, and a playback processor, when the CPU executes a program. The input receiver receives a writing made on the page, displayed on the display device. The application executor executes an application program. The browser expander acquires, when the application program is a browser application program for displaying a website on the display device, a task executed by the browser application program. The recording requester requests a data management system to record playback data, including the written data received by the input receiver and the task executed by the browser application program acquired by the browser expander, with a time stamp added to the written data and the executed task. The playback processor plays back the written data and the executed task included in the playback data acquired from the data management system, in synchronization according to the time stamp. The playback processor plays back the task executed by the browser application program, through the browser expander.

In another aspect, the disclosure provides an information processing system including a mobile terminal and a data management system. The data management system is connected to the mobile terminal via a network. The mobile terminal includes a display device and a control unit. The display device displays pages of a note. The control unit includes a CPU, and acts as an input receiver, an application executor, a note application, a recording requester, and a playback processor, when the CPU executes a program. The input receiver receives a writing made on the page, displayed on the display device. The application executor executes an application program. The note application is realized when the application executor executes a note application program, being the application program configured to cause the display device to display the page and enable writing on the page. The recording requester requests the data management system to record playback data, including the written data received by the input receiver and a task executed by the browser application program, with a time stamp added to the written data and the executed task. The playback processor plays back the written data and the executed task included in the playback data acquired from the data management system, in synchronization according to the time stamp.

BRIEF DESCRIPTION OF THE DRAWINGS

FIGS. 8A and 8B are schematic drawings each showing an example of the playback data shown in FIG. 7.

DETAILED DESCRIPTION

Hereafter, an embodiment of the disclosure will be described, with reference to the drawings.

First, a configuration of an information processing system according to the embodiment of the disclosure will be described.

Figure 1:
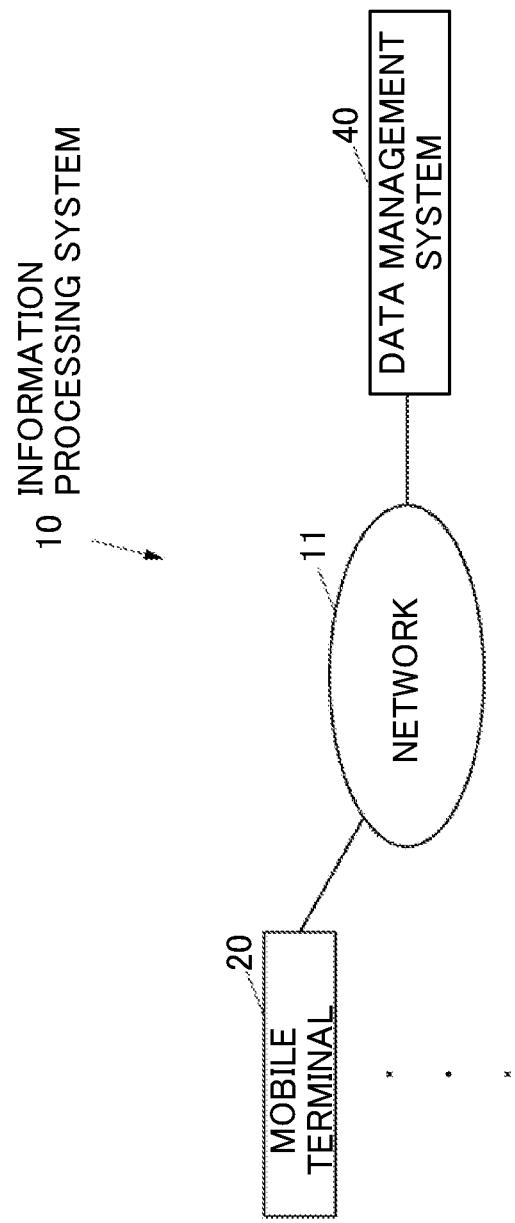
FIG. 1 is a block diagram of an information processing system according to an embodiment of the disclosure.

FIG. 1 is a block diagram of the information processing system 10 according to the embodiment.

As shown in FIG. 1, the information processing system 10 includes a mobile terminal 20. The information processing system 10 may include at least one mobile terminal similar to the mobile terminal 20, in addition thereto. The mobile terminals included in the information processing system 10 are, for example, utilized as a note by students.

The information processing system 10 includes a data management system 40 that manages data. The data management system 40 may be constituted of a single computer, or a plurality of computers. The data management system 40 may be based on a cloud service.

The mobile terminals included in the information processing system 10 and the data management system 40 can communicate with each other, through a network 11, such as a local area network (LAN) or the Internet.

Figure 2:
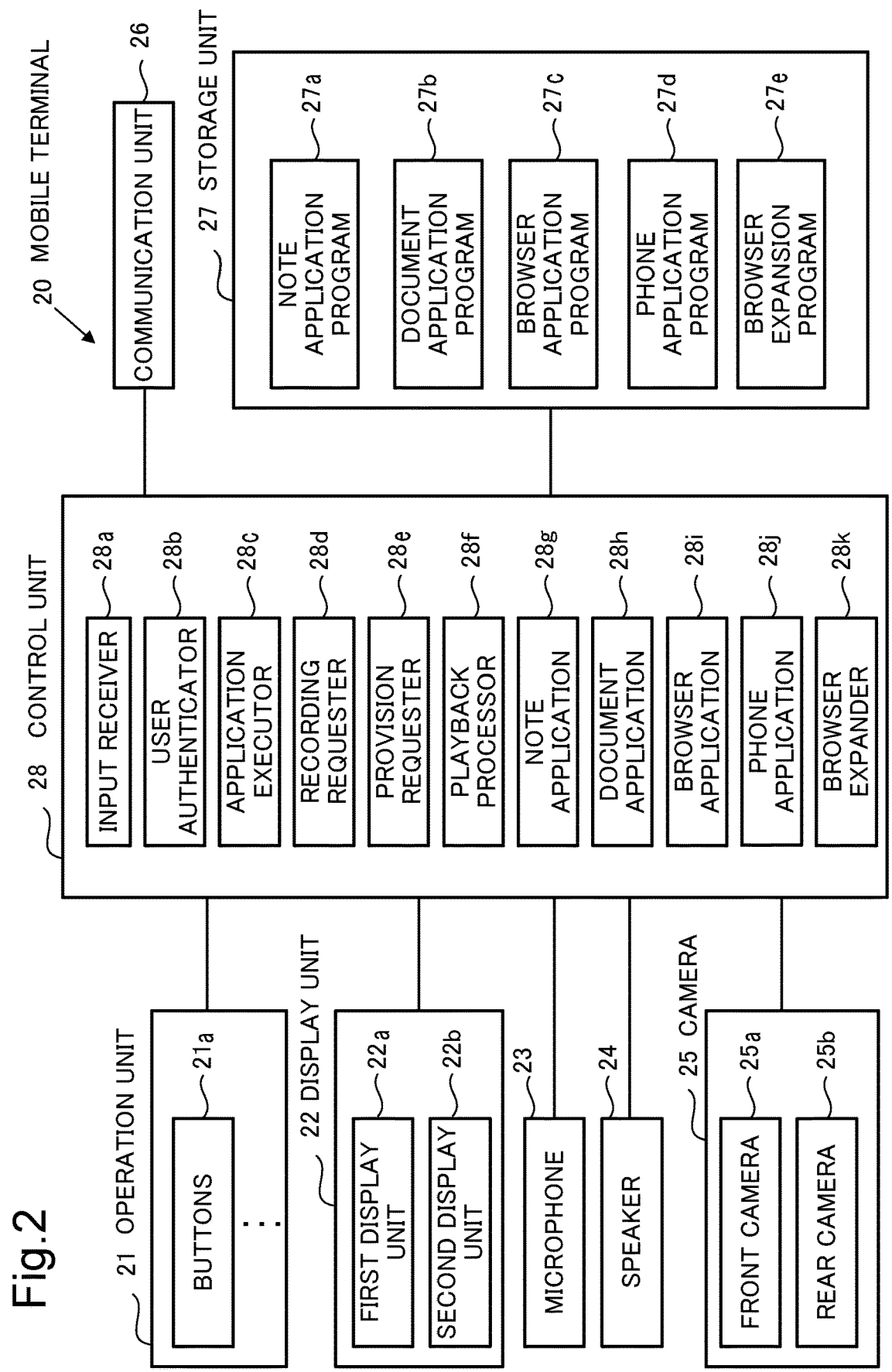
FIG. 2 is a block diagram showing a configuration of the mobile terminal shown in FIG. 1.

FIG. 2 is a block diagram showing a configuration of the mobile terminal 20.

As shown in FIG. 2, the mobile terminal 20 includes an operation unit 21 which is an operating device, for example having buttons for inputting various instructions, a display unit 22 which is a display device such as a liquid crystal display (LCD), for displaying various types of information, a microphone 23, a speaker 24, a camera 25, a communication unit 26 which is a communication device configured to communicate with external devices through a network such as a LAN or the Internet, or directly by a wired or wireless method without using the network, a storage unit 27 for storing various types of information, for example a semiconductor memory, or a non-volatile storage device such as a hard disk drive (HDD), and a control unit 28 that controls the overall operation of the mobile terminal 20.

Figure 3:
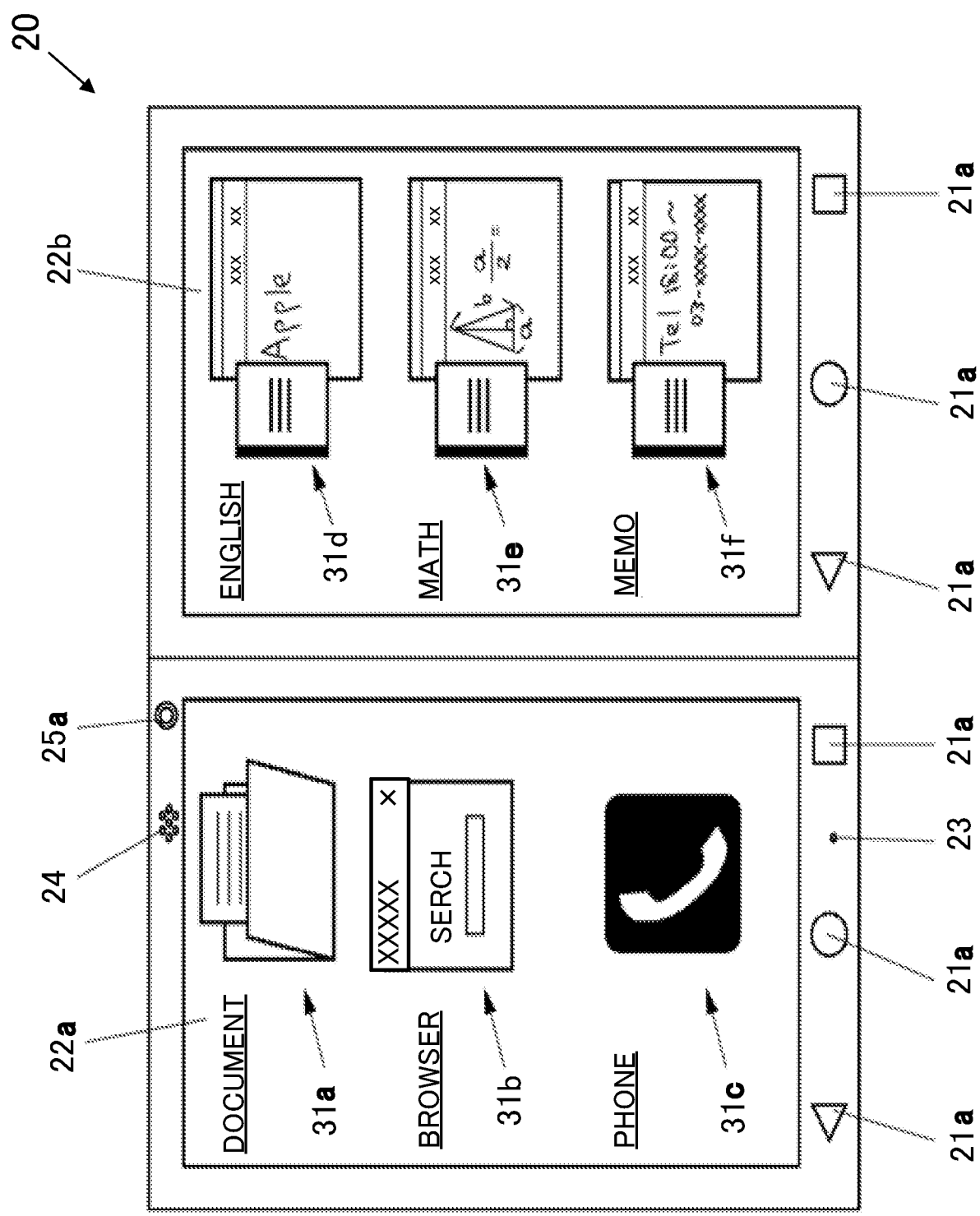
FIG. 3 is a front view of the mobile terminal shown in FIG. 2, in an opened state.
Figure 4:
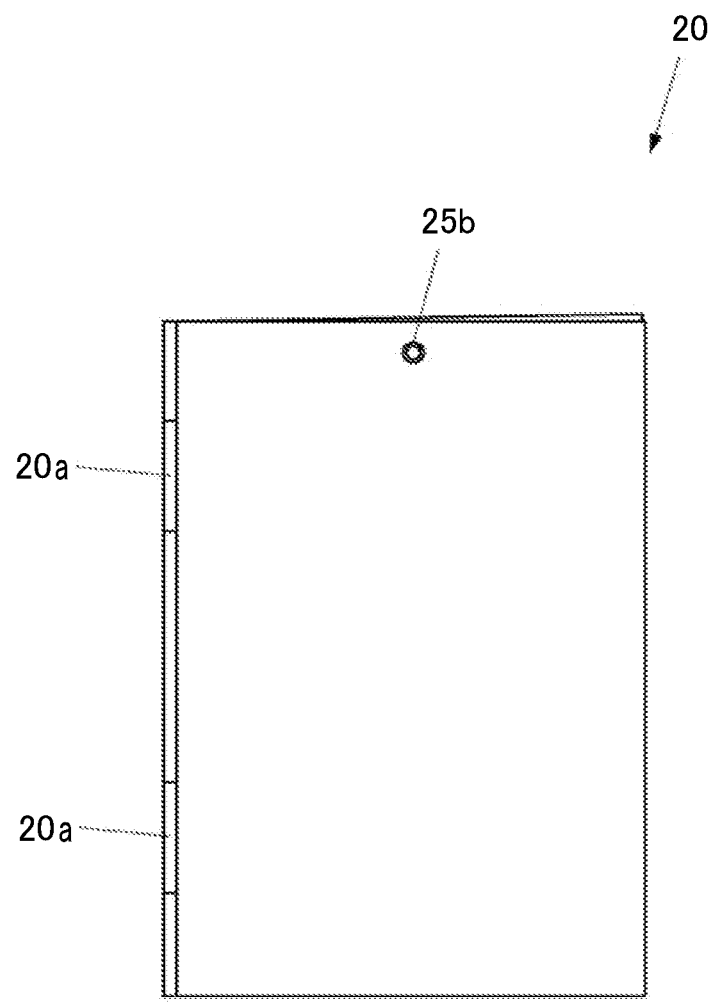
FIG. 4 is a front view of the mobile terminal shown in FIG. 2, in a closed state.

FIG. 3 is a front view of the mobile terminal 20 in an opened state. FIG. 4 is a front view of the mobile terminal 20 in a closed state.

As shown in FIG. 2 to FIG. 4, the operation unit 21 includes a plurality of buttons 21a for making various inputs.

The display unit 22 includes a first display unit 22a constituting a first touch panel in collaboration with a part of the operation unit 21, and a second display unit 22b constituting a second touch panel in collaboration with another part of the operation unit 21. The first display unit 22a is, for example, constituted of a liquid crystal display, an organic EL display, or a plasma display. The second display unit 22b is, for example, constituted of an electronic paper. Here, not only the second display unit 22b, but the first display unit 22a may also be constituted of an electronic paper. The first display unit 22a and the second display unit 22b may have an A4 size, which is convenient for use as a note.

The mobile terminal 20 includes a hinge portion 20a pivotally connecting the first display unit 22a and the second display unit 22b. The mobile terminal 20 can be set, by pivoting the first display unit 22a and the second display unit 22b with respect to each other about the hinge portion 20a, to an opened state in which the respective screens of the first display unit 22a and the second display unit 22b are located side by side in the same plane as shown in FIG. 3, and a closed state in which the respective screens of the first display unit 22a and the second display unit 22b (see FIG. 3) are opposed to each other as shown in FIG. 4.

The camera 25 includes a front camera 25a for shooting the front side of the mobile terminal 20 in the opened state, and a rear camera 25b for shooting the rear side of the mobile terminal 20 in the opened state.

The storage unit 27 contains various application programs. For example, the storage unit 27 contains a note application program 27a, for generating a note including a plurality of pages, and enabling writing on the generated note via the operation unit 21, a document application program 27b for creating, displaying, and editing documents in the Microsoft (registered trademark) Word format, the Microsoft (registered trademark) Excel (registered trademark) format, or the PDF format, a browser application program 27c for displaying web pages on the display unit 22, and a phone application program 27d for activating a phone call function. The note application program 27a, the document application program 27b, the browser application program 27c, and the phone application program 27d may be web applications.

On the first display unit 22a shown in FIG. 3, an icon 31a associated with the document application program 27b, an icon 31b associated with the browser application program 27c, and an icon 31c associated with the phone application program 27d, are displayed. On the second display unit 22b shown in FIG. 3, an icon 31d associated with the note application program 27a for creating a note for English, an icon 31e associated with the note application program 27a for creating a note for mathematics, and an icon 31f associated with the note application program 27a for creating a note for memorandum, are displayed.

The storage unit 27 contains a browser expansion program 27e, for acquiring a task to be executed by the browser application program 27c.

The control unit 28 includes, for example, a central processing unit (CPU), a read-only memory (ROM) containing programs and various types of data, and a random-access memory (RAM) to be used as the operating region of the CPU of the control unit 28. The CPU of the control unit 28 executes the programs stored in the storage unit 27, or in the ROM of the control unit 28.

The control unit 28 acts, by executing the programs stored in the storage unit 27, or in the ROM of the control unit 28, as an input receiver 28a that receives inputs made on the screen displayed on the display unit 22, a user authenticator 28b that performs user authentication, an application executor 28c that executes the application program, a recording requester 28d that transmits, to the data management system 40 (see FIG. 1), a request to record playback data of a page 32 (see FIG. 5) displayed on the second display unit 22b by the note application program 27a, a provision requester 28e that transmits, to the data management system 40, a request to provide the playback data of the page 32 displayed on the second display unit 22b by the note application program 27a, and a playback processor 28f that plays back the playback data acquired by the provision requester 28e.

The input receiver 28a displays, on the page 32, a point indicating a positional coordinate, for example inputted through the operation unit 21 to the page 32 displayed on the second display unit 22*b* by the note application program 27*a*. Accordingly, the locus of the positional coordinate inputted through the operation unit 21 is drawn on the page 32, as handwritten data. The input receiver 28*a* receives an instruction to activate, when one of the icons 31*a* to 31*f* shown in FIG. 3 is touched, the application program associated with the touched icon.

The user authenticator 28*b* displays an authentication screen for receiving an input of authentication information, on the display unit 22. The user authenticator 28*b* then transmits the authentication information inputted to the authentication screen through the input receiver 28*a*, to the data management system 40, and performs the user authentication in collaboration with the data management system 40. For example, the data management system 40 transmits, to the user authenticator 28*b*, an authentication success notice indicating that the authentication has been successfully performed, when the authentication information transmitted from the user authenticator 28*b* accords with one of the authentication information in account information registered in advance. Upon receipt of the authentication success notice from the data management system 40, the user authenticator 28*b* permits the user to log in. The authentication information may be, for example, a combination of a user ID and a password.

The application executor 28*c* activates, when the input receiver 28*a* receives an instruction to activate one of the application programs, the corresponding application program. The application executor 28*c* can execute a plurality of application programs in parallel.

The recording requester 28*d* transmits, on a real-time basis to the data management system 40 through the communication unit 26, a request to record the written data, written on the page 32 displayed on the second display unit 22*b* through the input receiver 28*a*, as playback data of the page 32 with a time stamp added thereto. The recording requester 28*d* also transmits, when the input receiver 28*a* receives a writing on the page 32, a request to record the task of the document application program 27*b*, the browser application program 27*c*, and the phone application program 27*d*, executed by the application executor 28*c*, with a time stamp added thereto, as the playback data of the page 32, on a real-time basis to the data management system 40 through the communication unit 26. Here, the time stamp refers to information indicating the current time of day, provided by a non-illustrated time-keeping device. In addition, the recording requester 28*d* can include voice data generated through the microphone 23, and image data shot by the camera 25, in the playback data.

When the page 32, with respect to which the playback data has been transmitted from the recording requester 28*d* to the data management system 40, is displayed on the second display unit 22*b*, the provision requester 28*e* transmits a request to provide the playback data of the page 32, to the data management system 40 through the communication unit 26, and thus receives the playback data from the data management system 40.

The playback processor 28*f* plays back the written data and the executed task included in the playback data acquired by the provision requester 28*e*, in synchronization on the basis of the time stamp added to the written data and the executed task.

The control unit 28 realizes a note application 28*g*, by executing the note application program 27*a*. The note application 28*g* enables creation of a new note including a plurality of pages, and display and editing thereof, through the second touch panel.

The control unit 28 realizes a document application 28*h*, by executing the document application program 27*b*. The document application 28*h* enables creation of a document such as a study material, and display and editing thereof, through the first touch panel.

The control unit 28 realizes a browser application 28*i*, by executing the browser application program 27*c*. The browser application 28*i* displays a website, for example acquired from the Internet through the communication unit 26, on the first display unit 22*a*.

The control unit 28 realizes a phone application 28*j*, by executing the phone application program 27*d*. The phone application 28*j* controls a voice communication with another user, through the communication unit 26. The phone application 28*j* can handle not only a one-to-one communication, but also a group communication among a plurality of persons.

The phone application 28*j* is linked with the note application 28*g*. When the application executor 28*c* activates the phone application program 27*d*, the phone application 28*j* displays an address book 33 (see FIG. 5) for selecting the call destination, on the first display unit 22*a*. When activating the phone application program 27*d*, the application executor 28*c* also activates the note application program 27*a*. When the application executor 28*c* activates the note application program 27*a*, the note application 28*g* displays a new page 32 (see FIG. 5) which accepts a writing, on the second display unit 22*b*. Therefore, the calling person can write a memorandum on the page 32 displayed on the second display unit 22*b* through the operation unit 21, during the phone call.

The page 32 displayed on the second display unit of the mobile terminal of the calling party is registered in the data management system 40 as a page that can be shared between the parties, thus to be shared therebetween. Upon receipt of the call from the phone application of the mobile terminal of the calling party, the mobile terminal of the receiving party activates the phone application program by the application executor to thereby enable a video call, and displays an image 34 representing the calling party (see FIG. 5) on the first display unit. Then the application executor of the mobile terminal of the receiving party activates the note application program, thereby acquiring the page 32 shared between the parties from the data management system 40, and displays the page 32 on the second display unit. Therefore, the calling party and the receiving party can share the writing, via the page 32 displayed on the second display unit of the mobile terminal.

Figure 5:
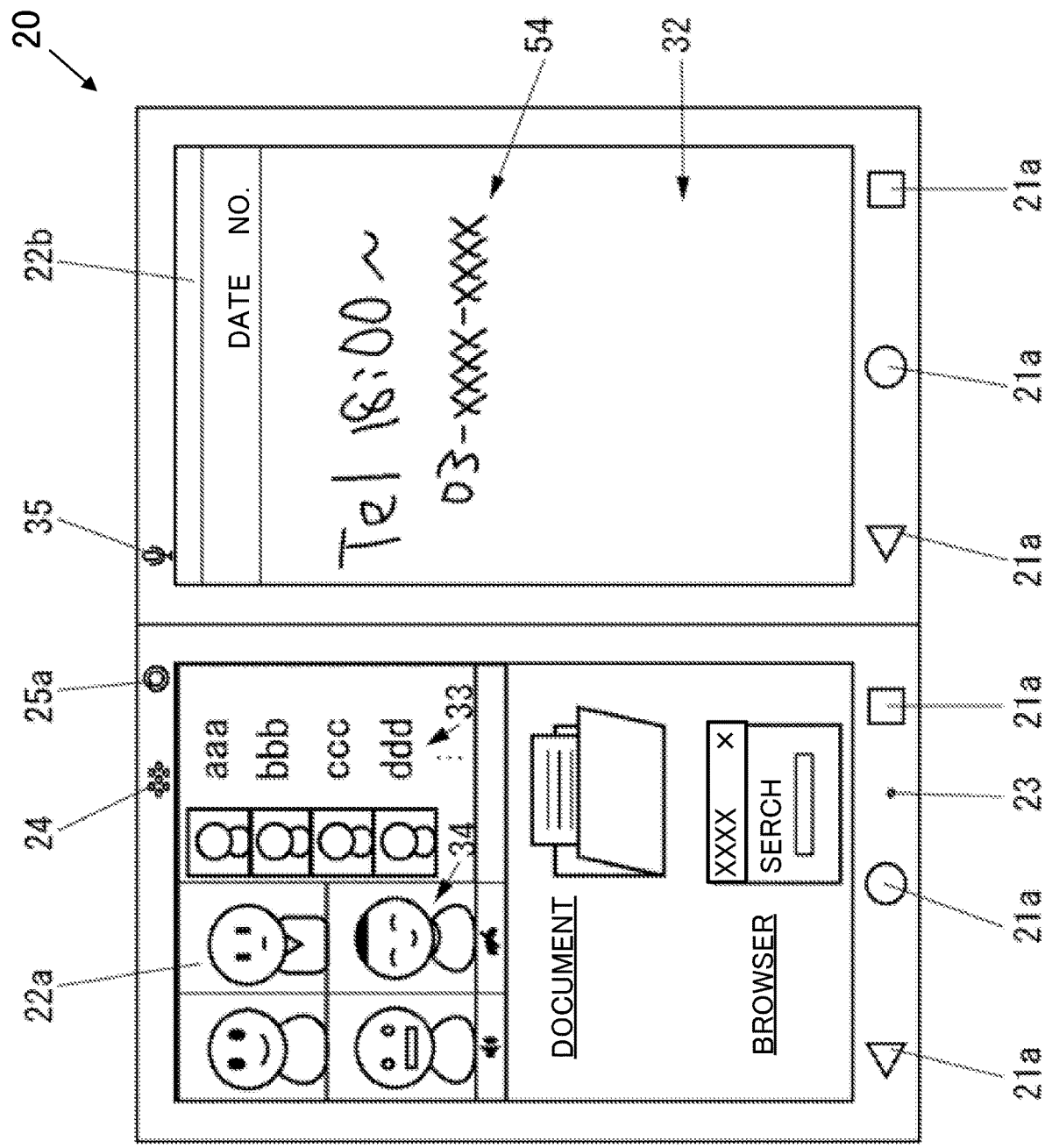
FIG. 5 is a front view of the mobile terminal shown in FIG. 3, in which a phone application and a note application are linked with each other.

When the input receiver 28*a* is receiving a writing made on the page 32 displayed on the second display unit 22*b* by the note application program 27*a*, a microphone button 35 is displayed on the second display unit 22*b*, as shown in FIG. 5. The microphone button 35 is turned on and off alternately, by each touch made through the operation unit 21. While the microphone button 35 is on, the microphone 23 generates voice data based on the inputted voice, and performs recording. When the microphone button 35 is turned on while the call is not made, the voice data generated by the microphone 23 is acquired by the recording requester 28*d*, as microphone-recorded data. When the microphone button 35 is turned on while the call is being made, the voice data generated by the microphone 23 is acquired by the recording requester 28*d* as outgoing recorded data. When the outgoing recorded data is acquired by the recording requester 28*d*, the voice data received by the receiving party through the network 11 is acquired by the recording requester 28*d*, as incoming recorded data.

The control unit 28 realizes a browser expander 28k, by executing the browser expansion program 27e. The browser expander 28k can acquire all of the events created by the browser application 28i, for example which website the browser application 28i has accessed, and also cause the browser application 28i to perform a desired action, for example accessing a desired website.

Figure 6:
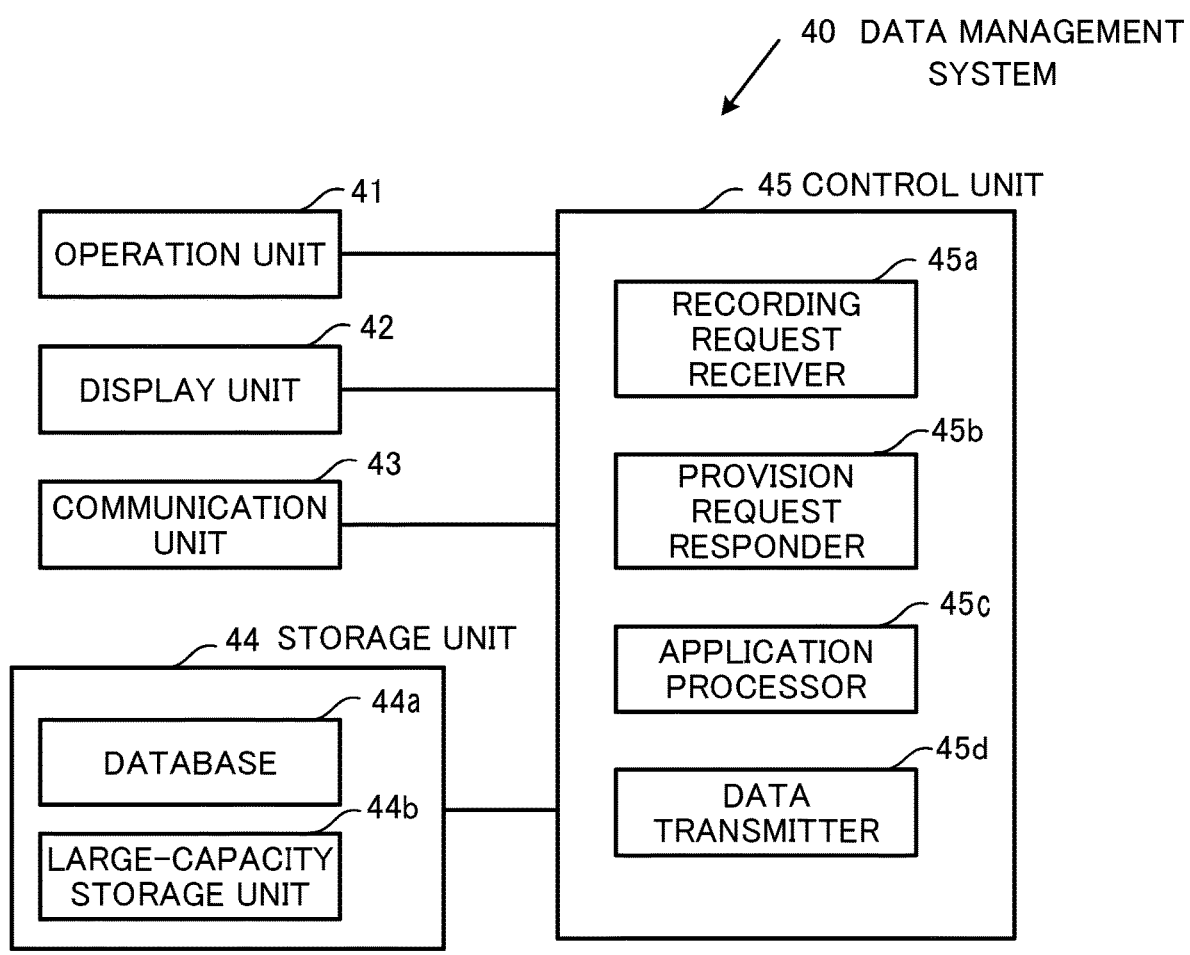
FIG. 6 is a block diagram of the data management system shown in FIG. 1, constituted of a single computer.

FIG. 6 is a block diagram of the data management system 40, constituted of a single computer.

The data management system 40 shown in FIG. 6 includes an operation unit 41 having operating devices such as a keyboard and a mouse, through which various inputs are made, a display unit 42 for example constituted of an LCD, for displaying various types of information, a communication unit 43 which is a communication device configured to communicate with external devices through a network such as a LAN or the Internet, or directly by a wired or wireless method without using the network, a storage unit 44 for storing various types of information, for example a semiconductor memory, or a non-volatile storage device such as a HDD, and a control unit 45 that controls the overall operation of the data management system 40.

The data management system 40 may include, for example, a message queue telemetry transport (MQTT) server, to share the writing made on the page by the parties through a plurality of mobile terminals. The MQTT server accepts registration of the parties of the call each time a call is made, and transfers the operation performed by one party on the mobile terminal to the mobile terminal of the other party on a real-time basis, thereby allowing the participants to share the writing made on the page. In addition, the MQTT server can allow the parties to share, not only the page, but also document data based on the document application program, and a website based on the browser application program.

The storage unit 44 may be, for example, constituted of a database server. The storage unit 44 includes a database 44a, and a large-capacity storage unit 44b.

Figure 7:
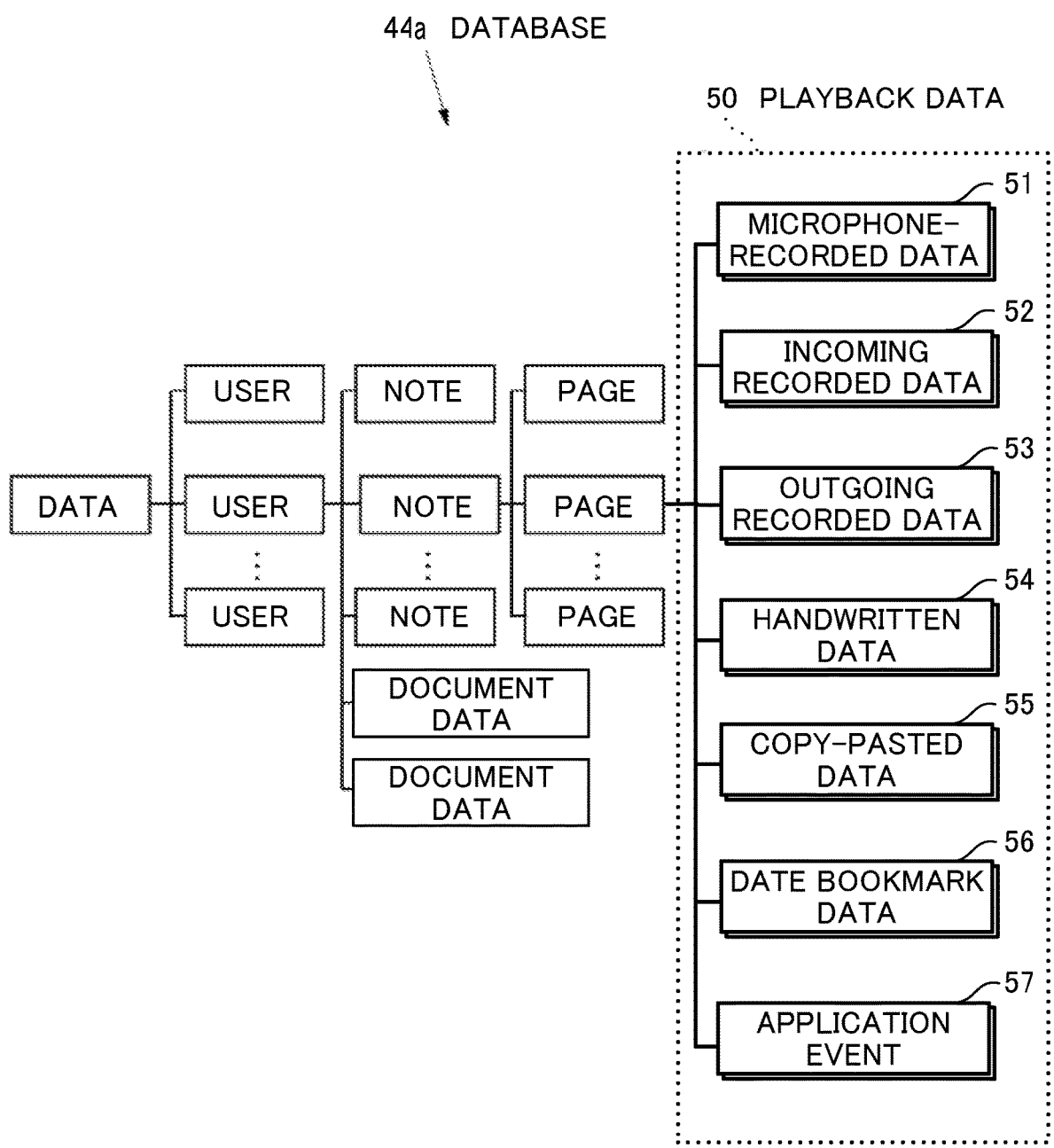
FIG. 7 is a schematic diagram showing a directory structure of the database shown in FIG. 6.

FIG. 7 illustrates the directory structure of the database 44a.

As shown in FIG. 7, the database 44a has a tier structure including tiers of "data", "user", "note", and "page", arranged in this order from the top. In the tier of "user" the users are listed so as to allow distinction from each other, for example by a user ID. In the tier of "note" the notes made out by the user are listed, so as to allow distinction from each other, for example by the note name. In the tier of "page" the pages constituting the note are listed, so as to allow distinction from each other, for example by a page ID.

Playback data 50 transmitted from the mobile terminal included in the information processing system 10 (see FIG. 1) is stored at a position subordinate to the tier of "page". The playback data 50 includes microphone-recorded data 51, incoming recorded data 52, outgoing recorded data 53, handwritten data 54, copy-pasted data 55, date bookmark data 56, and application event 57. The handwritten data 54 and the copy-pasted data 55 represent the writing drawn on the page, while the microphone-recorded data 51, the incoming recorded data 52, the outgoing recorded data 53, and the application event 57 are reference information looked up by the user when making the writing on the page. Thus, the database 44a gains both of the writing made on the page, and the reference information looked up when making the writing, with respect to each of the pages of the note created by each user.

FIGS. 8A and 8B each illustrate an example of the playback data 50.

As shown in FIGS. 8A and 8B, the microphone-recorded data 51, the incoming recorded data 52, and the outgoing recorded data 53 are recorded in a voice file format such as WAV. The handwritten data 54 is recorded in vector graphics such as SVG. The copy-pasted data 55 is recorded together with characters, images, and the URL of a linked website. The date bookmark data 56 includes information of date and time. The application event 57 includes tasks executed by the application.

In FIG. 7, the document data stored at a position subordinate to the tier of "user". When the application event 57 of the document application 28h (see FIG. 2) is included in the playback data 50, the application event 57 includes the file name of the document data displayed by the document application 28h. Accordingly, when the application event 57 of the document application 28h is included in the playback data 50, the document application 28h can acquire the document data to be displayed from the data management system 40, on the basis of the file name of the document data included in the application event 57, and display the document data.

The large-capacity storage unit 44b is, for example, constituted of a HDD, and used to store data of various formats such as WAV, XML, SVG, JSON, PDF, Microsoft Word, and Microsoft Excel. The entity of large-sized data, such as the microphone-recorded data 51, the incoming recorded data 52, the outgoing recorded data 53, the handwritten data 54, or the document data, is stored in the large-capacity storage unit 44b. Here, the large-capacity storage unit 44b exemplifies the storage unit in the disclosure.

The control unit 45 includes, for example, a CPU, a ROM containing programs and various types of data, and a RAM used as the operating region of the CPU of the control unit 45. The CPU of the control unit 45 executes the programs stored in the storage unit 44, or in the ROM of the control unit 45.

The control unit 45 realizes, by executing the program stored in the storage unit 44, or in the ROM of the control unit 45, a recording request receiver 45a that receives the request to record the playback data, transmitted from the mobile terminal included in the information processing system 10 (see FIG. 1) through the network 11 (see FIG. 1), and stores the playback data in the storage unit 44, a provision request responder 45b that receives the request to provide the playback data, transmitted from the mobile terminal included in the information processing system 10 through the network 11, retrieves the playback data from the storage unit 44, and returns the retrieved playback data to the mobile terminal through the network 11, an application processor 45c that performs various application processings in response to the request from each of the applications of the mobile terminal included in the information processing system 10, and a data transmitter 45d that transmits at least a part of the playback data recorded in the data management system 40, to outside of the information processing system 10. The recording request receiver 45a, the provision request responder 45b, the application processor 45c, and the data transmitter 45d may each be constituted of a web server.

The application processor 45c performs a call control through a network such as the public telephone line, for example in response to a request from the phone application of the mobile terminal. The data management system 40 may include a web RTC gateway, an IP-PBX, or a SIP server, to perform the phone call control. The application processor 45c may include one of a note application server that provides a note application function for the mobile terminal, a document application server that provides a document application function for the mobile terminal, a browser server that provides a browser application function for the mobile terminal, and a phone server that provides a phone application function for the mobile terminal.

Hereunder, an operation of the information processing system 10 will be described.

First, the operation of the information processing system 10, performed when storing the playback data 50 transmitted from the mobile terminal 20 in the data management system 40, will be described.

The user who has logged in with the permission of the user authenticator 28*b* can select, when the note application program 27*a* displays the page 32 on the second display unit 22*b*, whether to make a writing on the page 32, or play back the playback data 50 as will be subsequently described, through the operation unit 21. When the user selects making a writing on the page 32, the recording requester 28*d* of the mobile terminal 20 starts the operation shown in FIG. 9.

Figure 9:
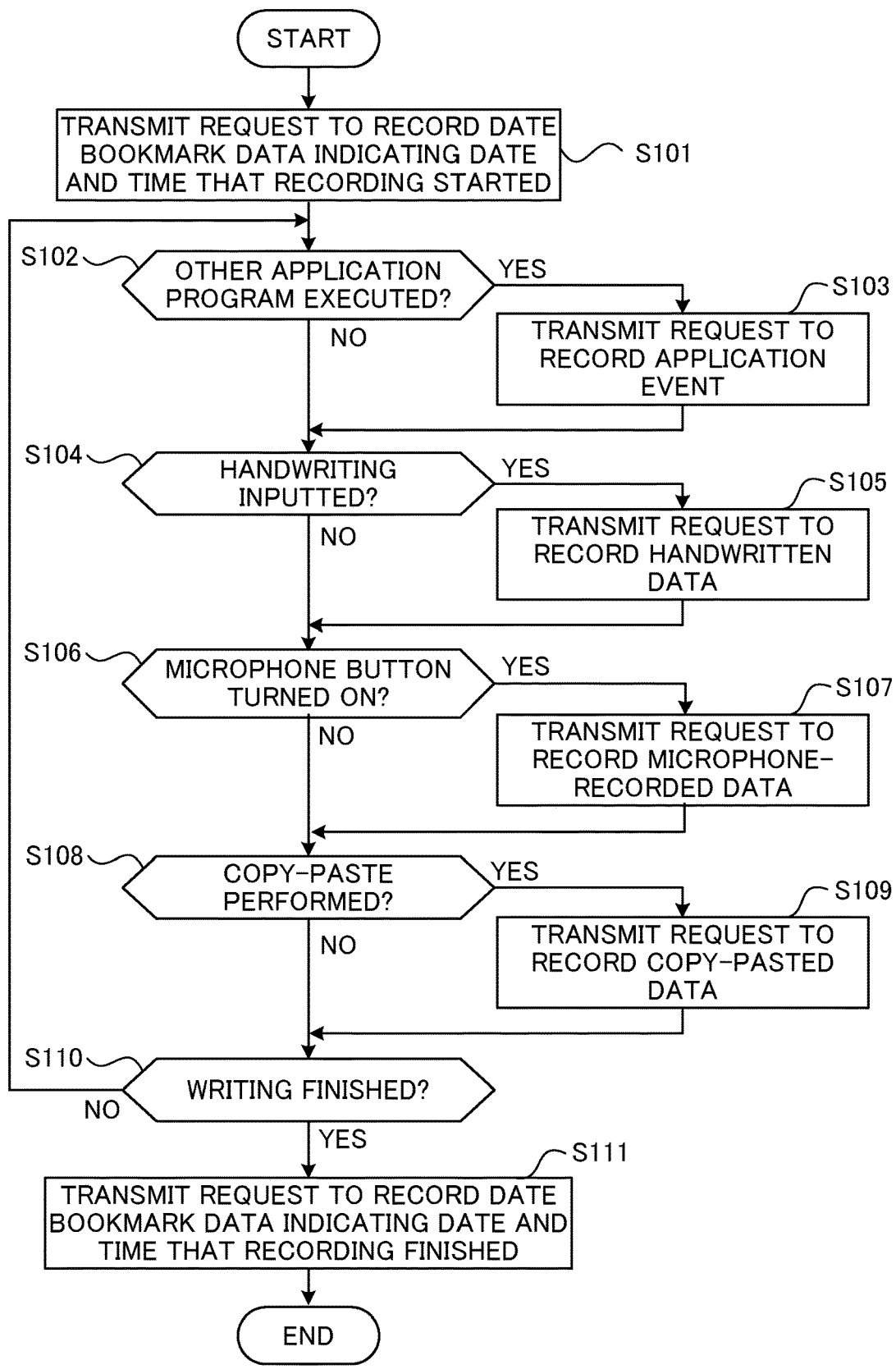
FIG. 9 is a flowchart of an operation performed by the mobile terminal shown in FIG. 2, when writing is made on a page.

FIG. 9 is a flowchart of the operation performed by the mobile terminal 20, when the writing is made on the page 32.

As shown in FIG. 9, the recording requester 28*d* of the mobile terminal 20 generates the date bookmark data indicating the date and time that the recording is started, adds a time stamp to the date bookmark data generated, and transmits a request to record the date bookmark data with the time stamp added thereto, to the data management system 40, as the date bookmark data in the playback data of the page 32 (S101). Accordingly, the recording request receiver 45*a* of the data management system 40 receives the recording request transmitted at S101 from the mobile terminal 20, and stores the date bookmark data, the recording of which has been requested, in the storage unit 44 at a position subordinate to the page 32, as at least a part of the date bookmark data 56 in the playback data 50 of the page 32.

After completing the operation of S101, the recording requester 28*d* of the mobile terminal 20 decides whether an application program other than the note application program 27*a*, in other words another application program, has been executed by the application executor 28*c* (S102).

Figure 10:
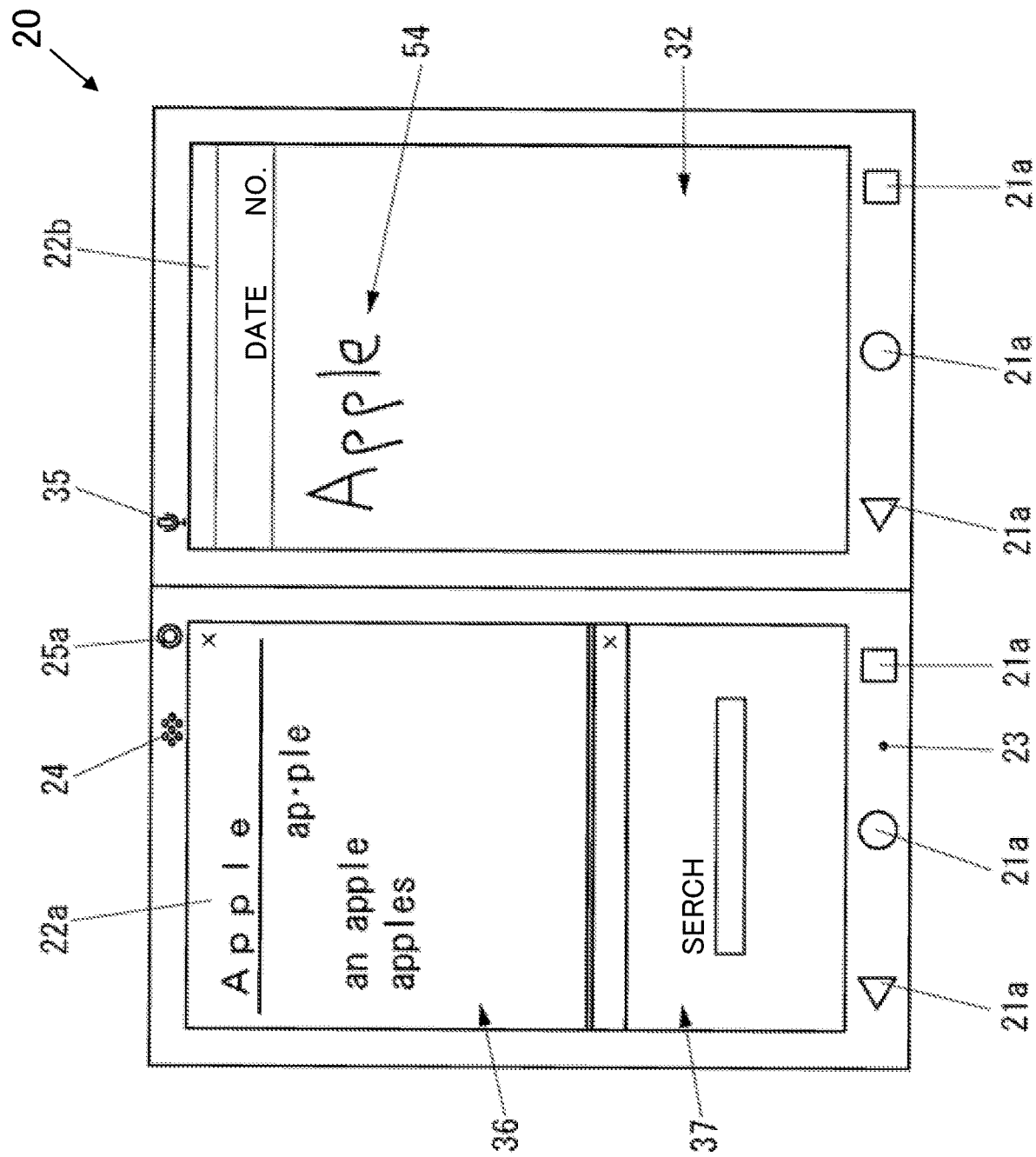
FIG. 10 is a front view of the mobile terminal shown in FIG. 3, for looking up document data or a Web page when writing is made on the page of the note.

Upon deciding at S102 that another application program, namely the document application program 27*b*, the browser application program 27*c*, or the phone application program 27*d* has been executed by the application executor 28*c*, the recording requester 28*d* acquires the application event indicating the task executed by the application executor 28*c* according to the corresponding application program. Then the recording requester 28*d* adds a time stamp to the application event acquired, and transmits a request to record the application event with the time stamp added thereto, to the data management system 40, as the application event in the playback data of the page 32 (S103). Here, the recording requester 28*d* takes up the task acquired by the browser expander 28*k*, as the task executed by the browser application program 27*c*. Accordingly, the recording request receiver 45*a* of the data management system 40 receives the recording request transmitted at S103 from the mobile terminal 20, and stores the application event, the recording of which has been requested, in the storage unit 44 at a position subordinate to the page 32, as at least a part of the application event 57 in the playback data 50 of the page 32. For example, when document data 36 based on the document application program 27*b*, or a website 37 based on the browser application program 27*c* is displayed on the first display unit 22*a*, while writing is being made on the page 32 displayed on the second display unit 22*b* as shown in FIG. 10, the recording requester 28*d* of the mobile terminal 20 acquires the application event representing the task executed by the document application program 27*b* and the application event representing the task executed by the browser application program 27*c*, adds a time stamp to each of the application events acquired, and transmits a request to record the application events with the time stamp added thereto, to the data management system 40, as the application events in the playback data of the page 32. Therefore, the recording request receiver 45*a* of the data management system 40 can record the information related to the document data and the website, looked up by the user when making the writing on the page 32 on the mobile terminal 20, in association with the page 32.

Upon deciding at S102 that no other application program has been executed by the application executor 28*c*, or completing the operation of S103, the recording requester 28*d* of the mobile terminal 20 decides whether a hand-writing on the page 32 has been inputted through the input receiver 28*a* (S104).

Upon deciding at S104 that the hand-writing on the page 32 has been inputted through the input receiver 28*a*, the recording requester 28*d* acquires the handwritten data on the page 32 received by the input receiver 28*a*, adds a time stamp to the handwritten data acquired, and transmits a request to record the handwritten data with the time stamp added thereto, to the data management system 40, as the handwritten data in the playback data of the page 32 (S105). Accordingly, the recording request receiver 45*a* of the data management system 40 receives the recording request transmitted at S105 from the mobile terminal 20, and stores the handwritten data, the recording of which has been requested, in the storage unit 44 at a position subordinate to the page 32, as at least a part of the handwritten data 54 in the playback data 50 of the page 32.

Upon deciding at S104 that a hand-writing on the page 32 has not been inputted through the input receiver 28*a*, or completing the operation of S105, the recording requester 28*d* of the mobile terminal 20 decides whether the microphone button 35 has been turned on, through the input receiver 28*a* (S106).

Upon deciding at S106 that the microphone button 35 has been turned on through the input receiver 28*a*, the recording requester 28*d* acquires one of the microphone-recorded data, the incoming recorded data, and the outgoing recorded data depending on the communication status, adds a time stamp to the recorded data acquired, and transmits a request to record the recorded data with the time stamp added thereto, to the data management system 40, as the recorded data in the playback data of the page 32 (S107). Accordingly, the recording request receiver 45*a* of the data management system 40 receives the recording request transmitted at S107 from the mobile terminal 20, and stores the recorded data, the recording of which has been requested, in the storage unit 44 at a position subordinate to the page 32, as at least a part of the recorded data in the playback data 50 of the page 32. When the recorded data the recording of which has been requested, transmitted at S107 from the mobile terminal 20, is the microphone-recorded data, the recording request receiver 45*a* stores the microphone-recorded data in the storage unit 44 as at least a part of the microphone-recorded data 51 in the playback data 50 of the page 32. When the recorded data the recording of which has been requested, transmitted at S107 from the mobile terminal 20, is the incoming recorded data, the recording request receiver 45*a* stores the incoming recorded data in the storage unit 44 as at least a part of the incoming recorded data 52 in the playback data 50 of the page 32. When the recorded data the recording of which has been requested, transmitted at S107 from the mobile terminal 20, is the outgoing recorded data, the recording request receiver 45*a* stores the outgoing recorded data in the storage unit 44 as at least a part of the outgoing recorded data 53 in the playback data 50 of the page 32. Therefore, for example the voice of a teacher, or a voice on a phone call, recorded by the mobile terminal 20 when the input receiver 28*a* is receiving a writing on the page 32 displayed on the second display unit 22*b* by the note application program 27*a*, can be recorded in the data management system 40 in association with the page 32.

Figure 11:
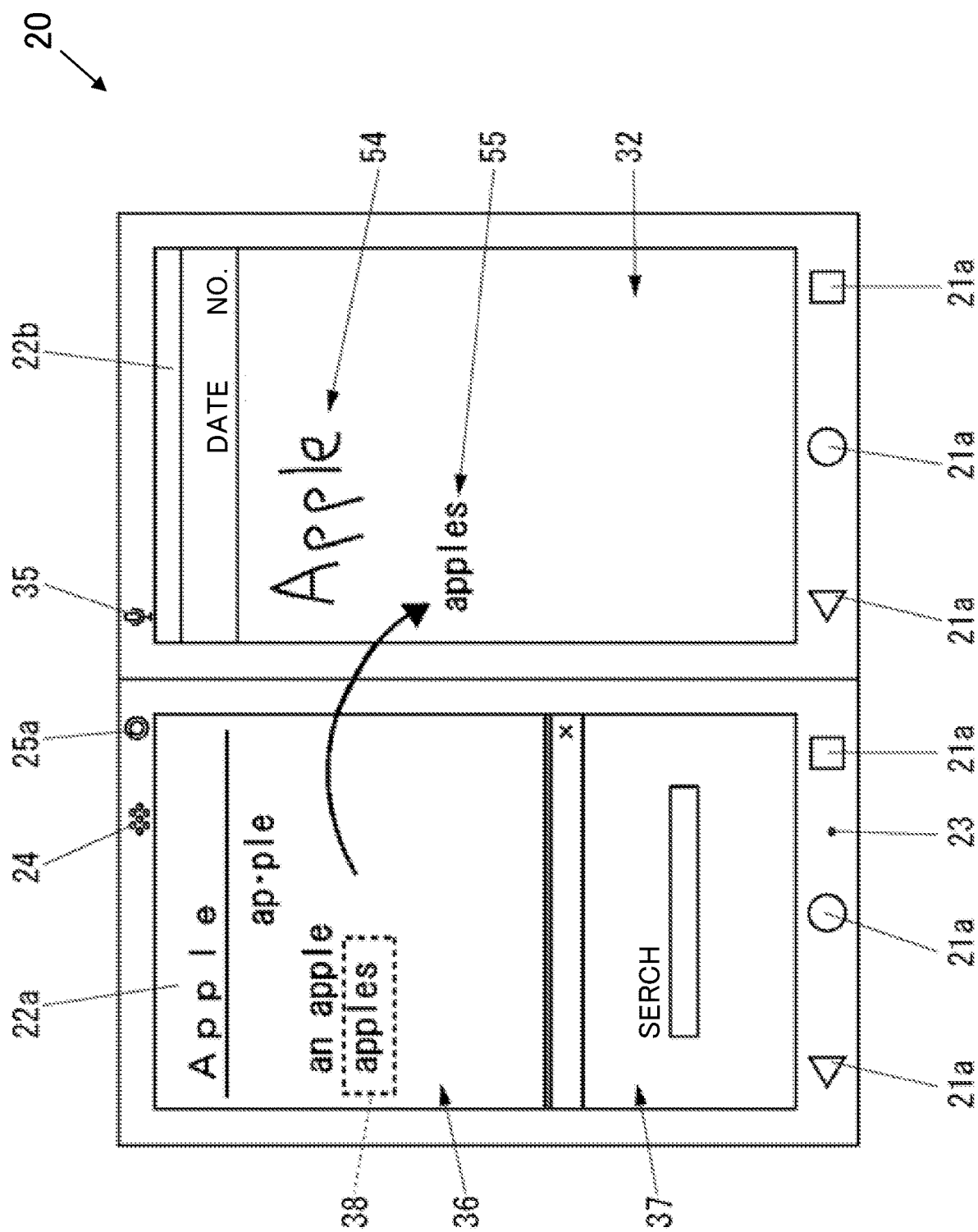
FIG. 11 is a front view of the mobile terminal shown in FIG. 3, in which the document data is copy-pasted on the page of the note.

Upon deciding at S106 that the microphone button 35 has not been turned on through the input receiver 28*a*, or completing the operation of S107, the recording requester 28*d* of the mobile terminal 20 decides whether a copy-paste has been applied to the page 32, through the input receiver 28*a* (S108). For example, the user can select a region to be copied 38 from the document data 36 or the website 37 through the operation unit 21, copy the characters and images, and link information from the region to be copied 38, and paste the copy to a designated position on the page 32, as shown in FIG. 11. The user can also copy-paste a writing made by another user on a page of a note, to his/her own page 32.

Upon deciding at S108 that a copy-paste has been applied to the page 32 through the input receiver 28*a*, the recording requester 28*d* acquires the copy-pasted data written on the page 32 through the input receiver 28*a*, adds a time stamp to the copy-pasted data acquired, and transmits a request to record the copy-pasted data with the time stamp added thereto, to the data management system 40, as the copy-pasted data in the playback data of the page 32 (S109). Accordingly, the recording request receiver 45*a* of the data management system 40 receives the recording request transmitted at S109 from the mobile terminal 20, and stores the copy-pasted data, the recording of which has been requested, in the storage unit 44 at a position subordinate to the page 32, as at least a part of the copy-pasted data 55 in the playback data 50 of the page 32.

Upon deciding at S108 that a copy-paste has not been applied to the page 32 through the input receiver 28*a*, or completing the operation of S109, the recording requester 28*d* of the mobile terminal 20 decides whether the writing made through the input receiver 28*a* has finished (S110). For example, when an instruction to close the note, or display a next page, is inputted through the operation unit 21, the input receiver 28*a* finishes receiving the writing on the page 32 thus far displayed.

Upon deciding at S110 that the input receiver 28*a* has not finished receiving the writing, the recording requester 28*d* of the mobile terminal 20 executes the operation of S102. More specifically, the recording requester 28*d* transmits the recording request of the playback data of the page 32, while the input receiver 28*a* is receiving the writing on the page 32.

Upon deciding at S110 that the input receiver 28*a* has finished receiving the writing, the recording requester 28*d* of the mobile terminal 20 generates the date bookmark data indicating the date and time that the recording has been finished, adds a time stamp to the date bookmark data generated, and transmits a request to record the date bookmark data with the time stamp added thereto, to the data management system 40, as the date bookmark data in the playback data of the page 32 (S111). Accordingly, the recording request receiver 45*a* of the data management system 40 receives the recording request transmitted at S111 from the mobile terminal 20, and stores the date bookmark data, the recording of which has been requested, in the storage unit 44 at a position subordinate to the page 32, as at least a part of the date bookmark data 56 in the playback data 50 of the page 32.

Upon completing the operation of S111, the recording requester 28*d* of the mobile terminal 20 finishes the operation shown in FIG. 9.

Hereunder, an operation of the information processing system 10, performed when the user copy-pastes a writing made on a page of a note by another user to his/her own page 32, will be described in detail.

Figure 12:
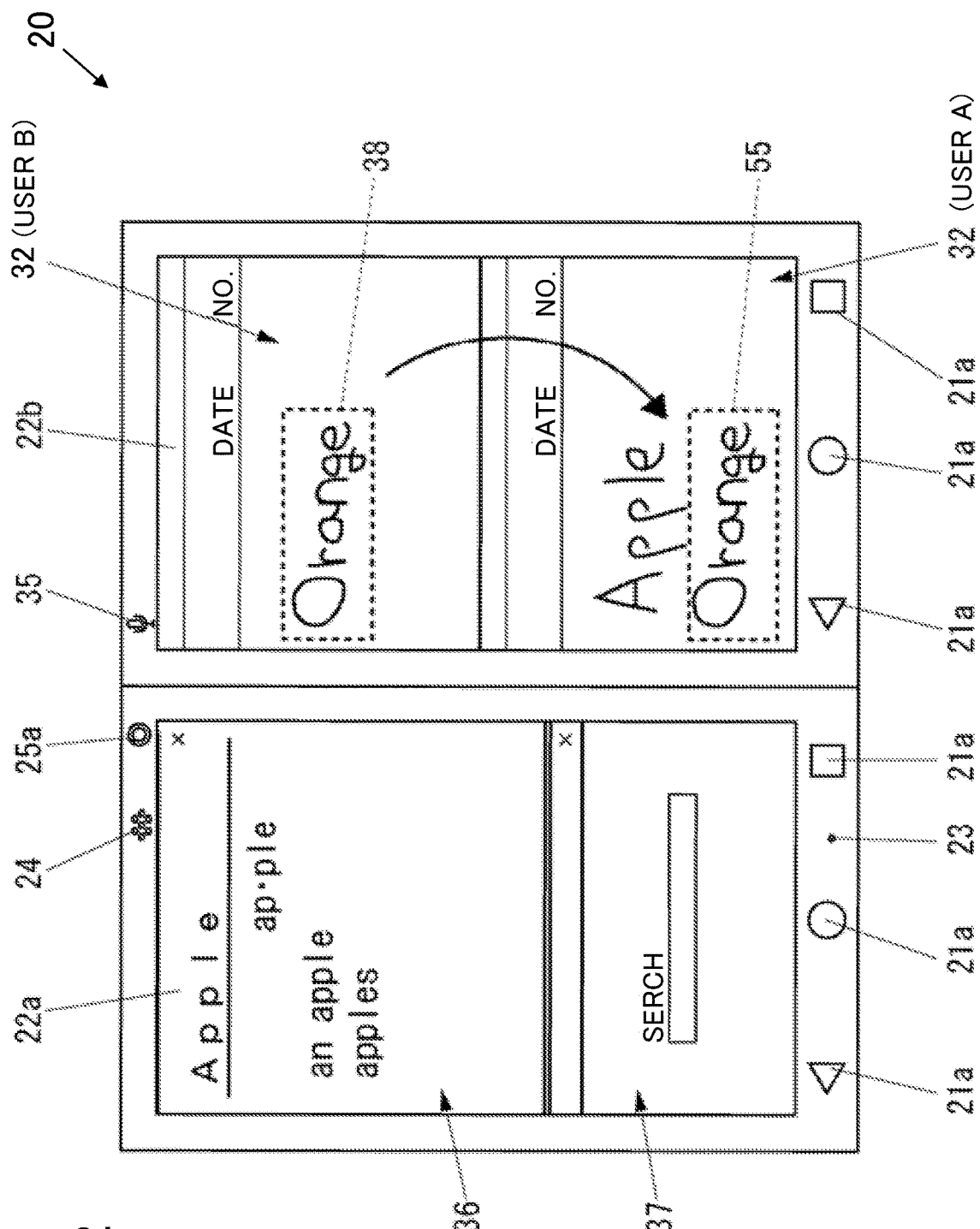
FIG. 12 is a front view of the mobile terminal shown in FIG. 3, in which a writing of another user on the page is copy-pasted on the page of the note.

The user (hereinafter, "user A") can cause the page of the note created by another user (hereinafter, "user B") to be displayed on the second display unit 22*b* of the mobile terminal 20 of the user A as shown in FIG. 12, and copy-paste the writing on the page of the user B to the user A's own page 32. In this case, the user A can cause the page permitted by the user B to be displayed on the user A's own mobile terminal 20, by inputting a predetermined authentication key. The user B may communicate with the data management system 40 via the note application 28*g* of the user B's own mobile terminal, to set in advance an authentication key such as a password, to the page that may be disclosed to the user A.

Figure 13:
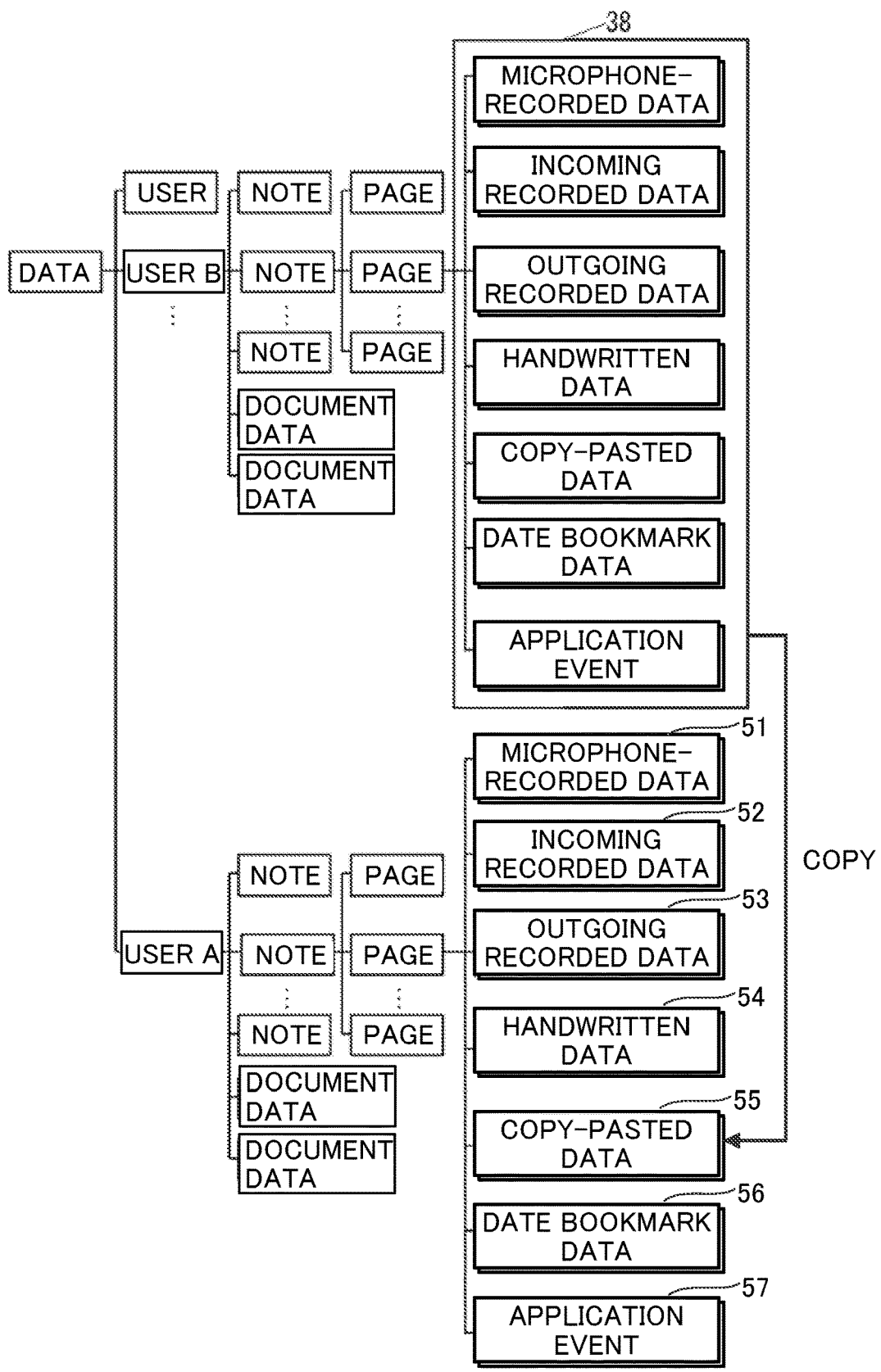
FIG. 13 is a schematic diagram showing a directory structure of the database, formed when the writing of another user shown in FIG. 12 is copy-pasted on the page of the note.

When the recording requester 28*d* of the mobile terminal 20 of the user A transmits at S109 a request to record the copy-pasted data from the writing on the page of the user B, to the data management system 40, the recording request receiver 45*a* of the data management system 40 stores, as shown in FIG. 13, the copy-pasted data including the playback data of the user B corresponding to the region to be copied 38, in the storage unit 44 at a position subordinate to the page 32, as at least a part of the copy-pasted data 55 in the playback data 50 of the page 32. Thus, not only the written data in the region to be copied 38 (handwritten data 54 and copy-pasted data 55), but the entire playback data of the user B in the region to be copied 38, corresponding to a range from the first time stamp to the last time stamp, is copied.

Figure 14:
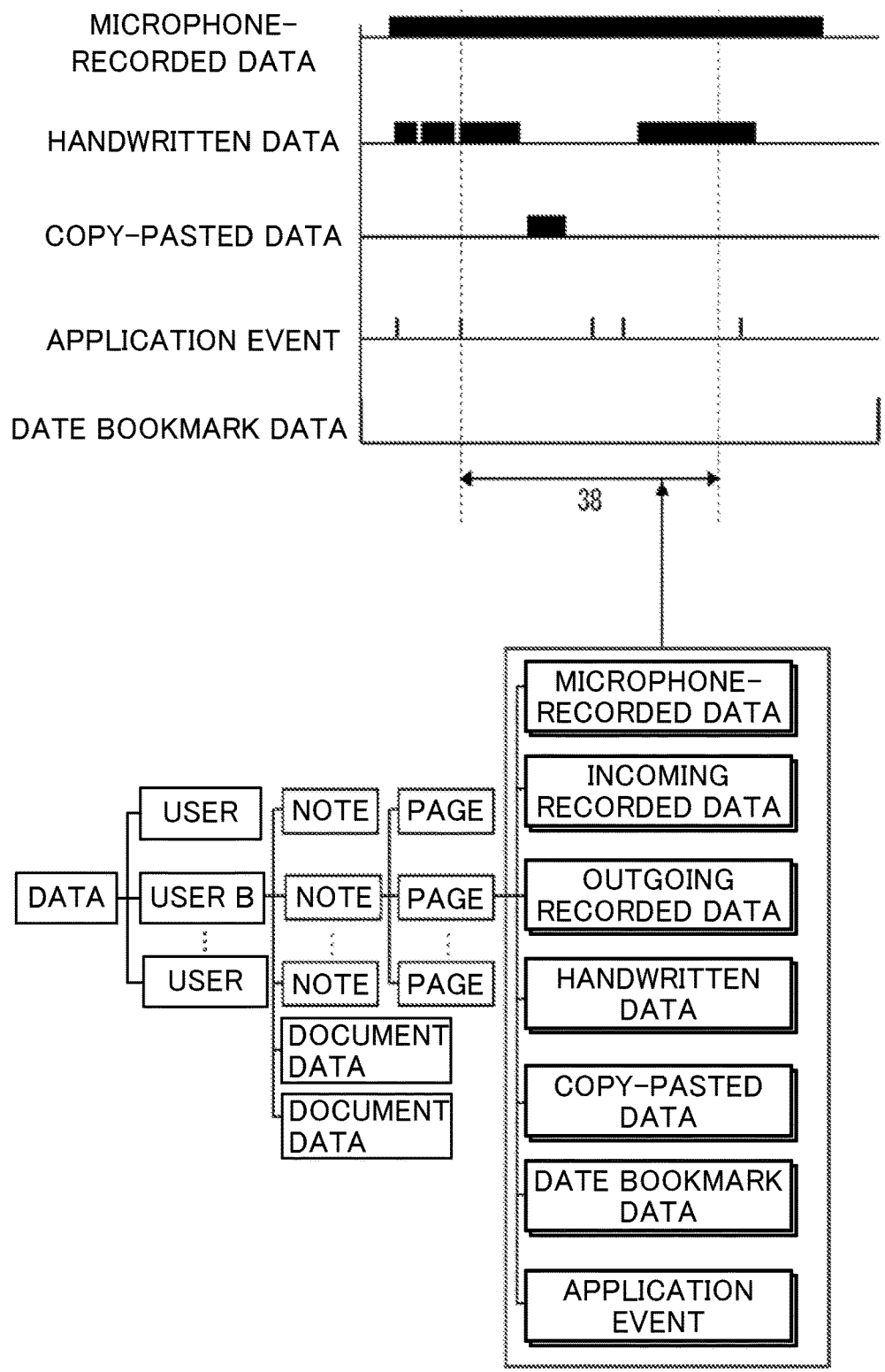
FIG. 14 is a diagram showing the playback data corresponding to a region to be copied shown in FIG. 12.

In FIG. 14, for example, the microphone-recorded data, the handwritten data, the copy-pasted data, and the application event are included in the playback data of the user B corresponding to the region to be copied 38. Therefore, the written data in the region to be copied 38 copied by the user A from the page of the user B is pasted on the user A's page 32, accompanied with the document data and website information looked up by the user B for the writing, as a backbone.

Figure 15:
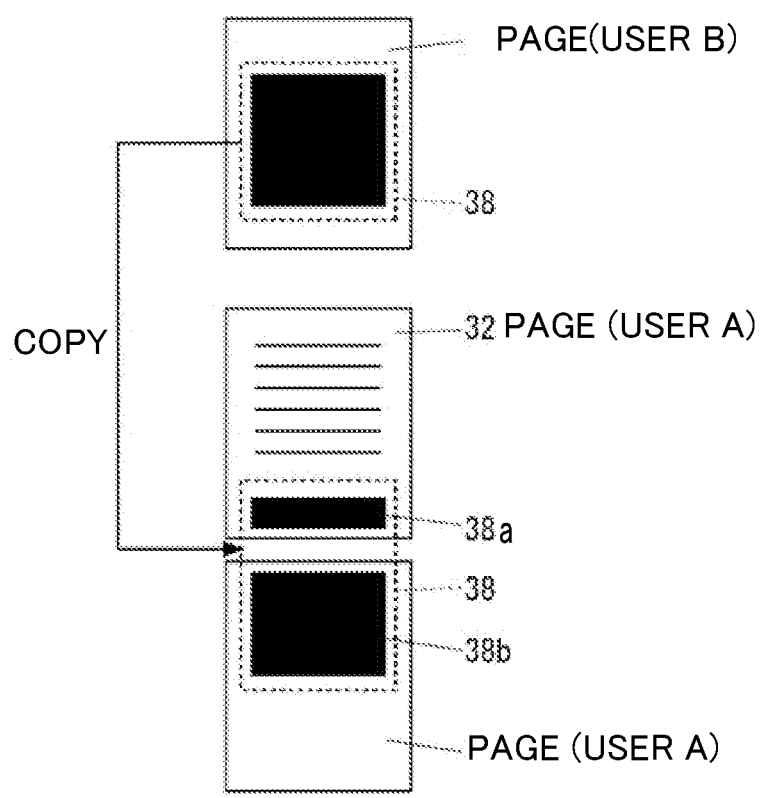
FIG. 15 is a schematic drawing showing a plurality of pages, on which the region to be copied shown in FIG. 12 is divided and copied.
Figure 16:
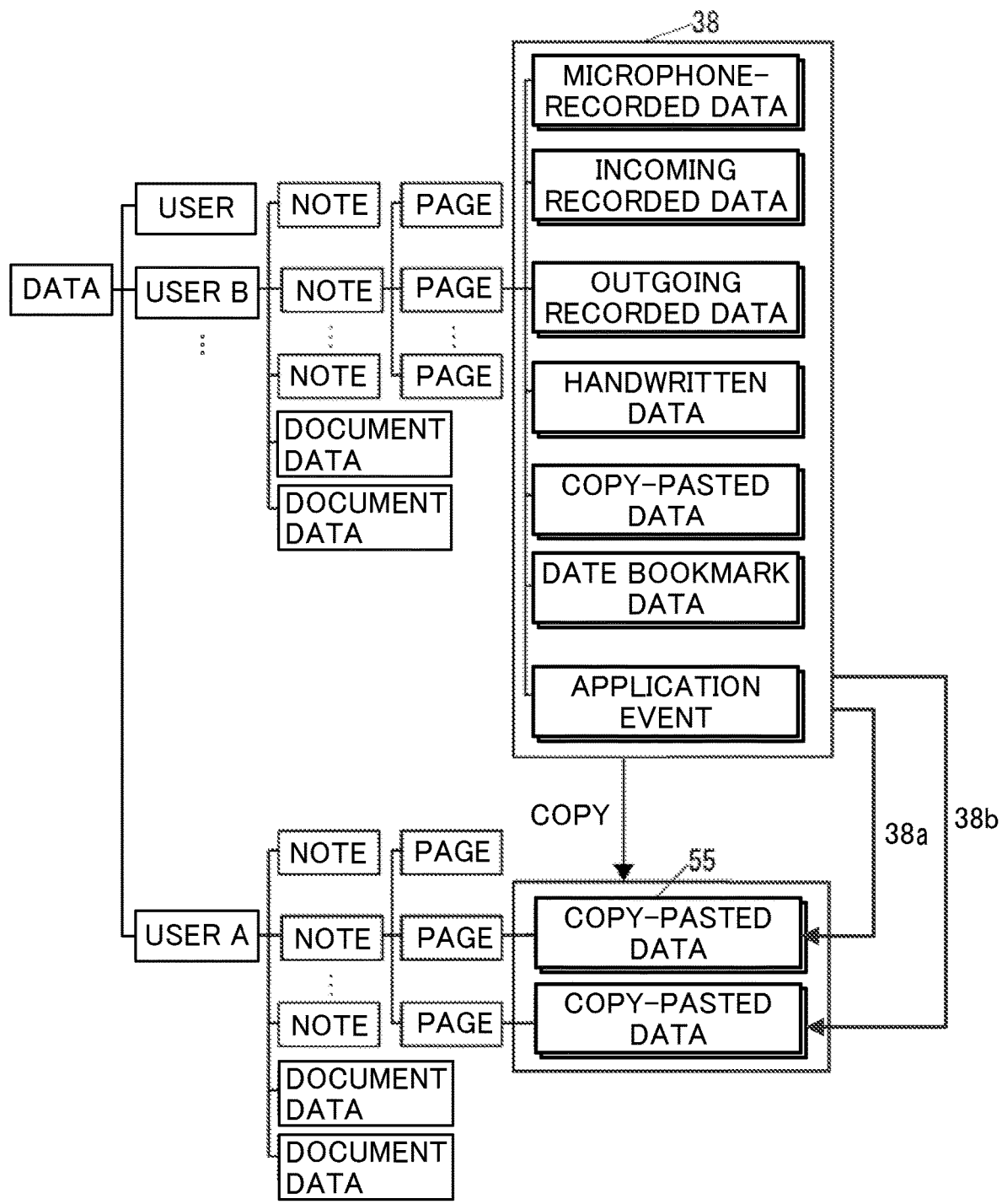
FIG. 16 is a schematic diagram showing a directory structure of the database, formed when the region to be copied shown in FIG. 12 is divided and copied over a plurality of pages.
Figure 17:
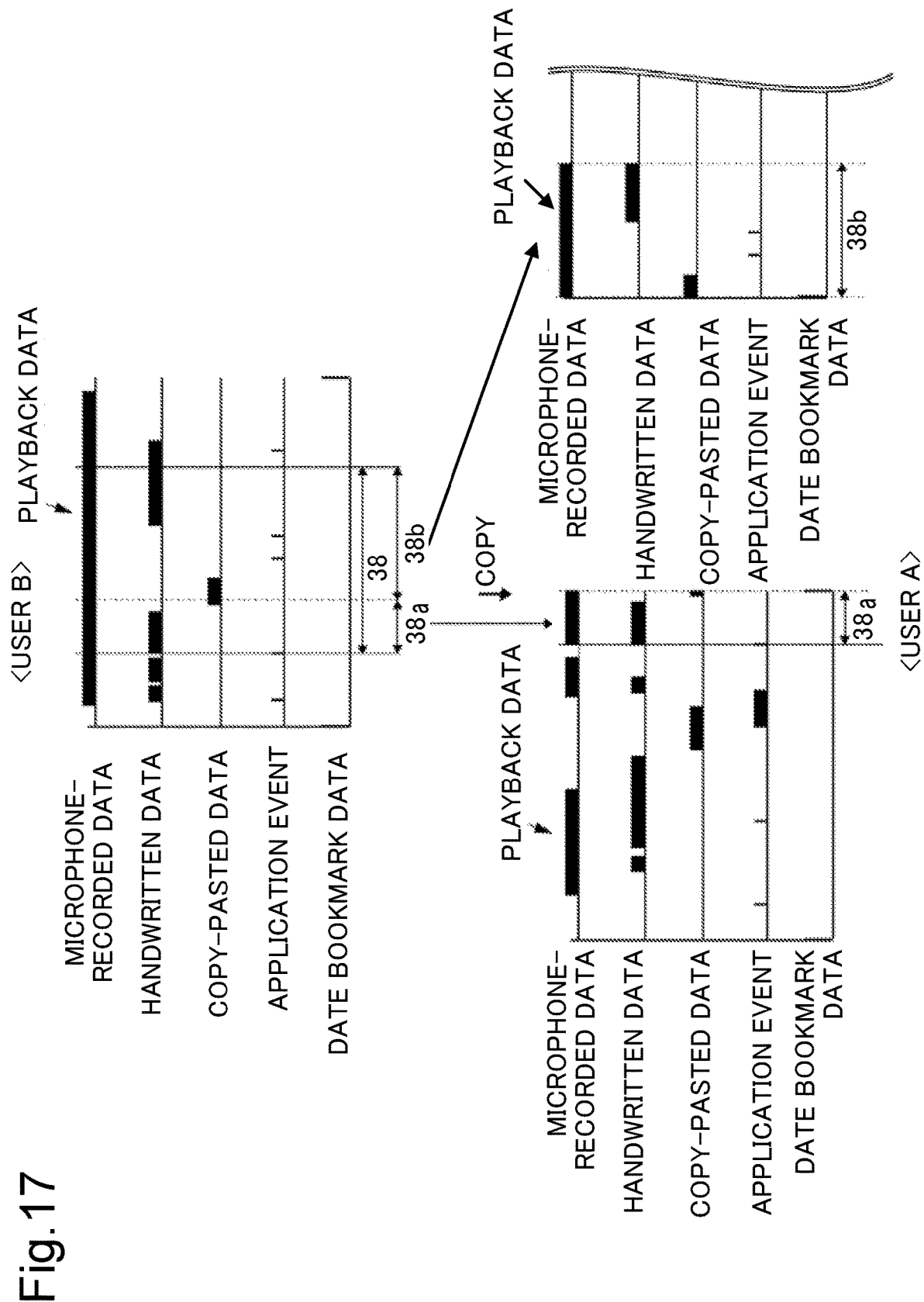
FIG. 17 is a diagram showing the playback data representing the case where the region to be copied shown in FIG. 12 is divided and copied over a plurality of pages.

When the size of the region to be copied 38, copied from the page of the user B to be pasted to the page 32 of the user A, is larger than the size of the remaining writing area (pasteable area) of the page 32 as shown in FIG. 15, the region to be copied 38 is dividedly pasted on the page 32 and a page following the page 32. In the example shown in FIG. 15, the region to be copied 38 is divided into a region to be copied 38*a* to be pasted on the page 32, and a region to be copied 38*b* to be pasted on the page following the page 32. Accordingly, the recording requester 28*d* of the mobile terminal 20 of the user A first adds a time stamp to the copy-pasted data of the region to be copied 38*a*, and transmits a request to record the copy-pasted data with the time stamp added thereto, to the data management system 40, as the copy-pasted data in the playback data of the page 32 (S109). The recording requester 28*d* then decides that the writing has been finished because the writing area is no longer available on the page 32, generates the date bookmark data indicating the date and time that the recording has been finished, adds a time stamp to the date bookmark data generated, and transmits a request to record the date bookmark data with the time stamp added thereto, to the data management system 40, as the date bookmark data in the playback data of the page 32 (S111). Then the note application program 27a displays a page following the page 32 to be used to paste the region to be copied 38b, so that the input receiver 28a becomes ready to receive the writing. The recording requester 28d of the mobile terminal 20 of the user A generates the date bookmark data indicating the date and time that the recording has started, adds a time stamp to the date bookmark data generated, and transmits a request to record the date bookmark data with the time stamp added thereto, to the data management system 40, as the date bookmark data in the playback data of the page following the page 32 (S101). Since the region to be copied 38b is pasted on the page following the page 32, the recording requester 28d adds a time stamp to the copy-pasted data from the region to be copied 38b, and transmits a request to record the copy-pasted data with the time stamp added thereto, to the data management system 40, as the copy-pasted data in the playback data of the page following the page 32 (S109). Accordingly, the recording request receiver 45a of the data management system 40 copies the playback data corresponding to the region to be copied 38a of the user B, and the playback data corresponding to the region to be copied 38b of the user B, as the copy-pasted data 55 in the storage unit 44, at positions subordinate to a plurality of successive pages of the user A, as shown in FIG. 16 and FIG. 17.

When the source to be copied in the region to be copied 38, owned by the user B, includes written data copied from a page of a user C, the region to be copied 38 includes the playback data of the user B and the playback data of the user C. In this case, the recording request receiver 45a of the data management system 40 copies, upon receipt of the request to record the copy-pasted data from the user A as the playback data, the playback data of the plurality of users corresponding to the region to be copied 38, as the copy-pasted data 55 in the storage unit 44, at a position subordinate to the page of the user A.

Hereunder, an operation of the information processing system 10, performed when the playback data 50 stored in the data management system 40 is played back by the mobile terminal 20, will be described.

The user who has logged in with the permission of the user authenticator 28b can input an instruction to open the note, through the operation unit 21 of the mobile terminal 20. When the input receiver 28a of the mobile terminal 20 receives the instruction to open the note, the provision requester 28e of the mobile terminal 20 starts the operation shown in FIG. 18.

Figure 18:
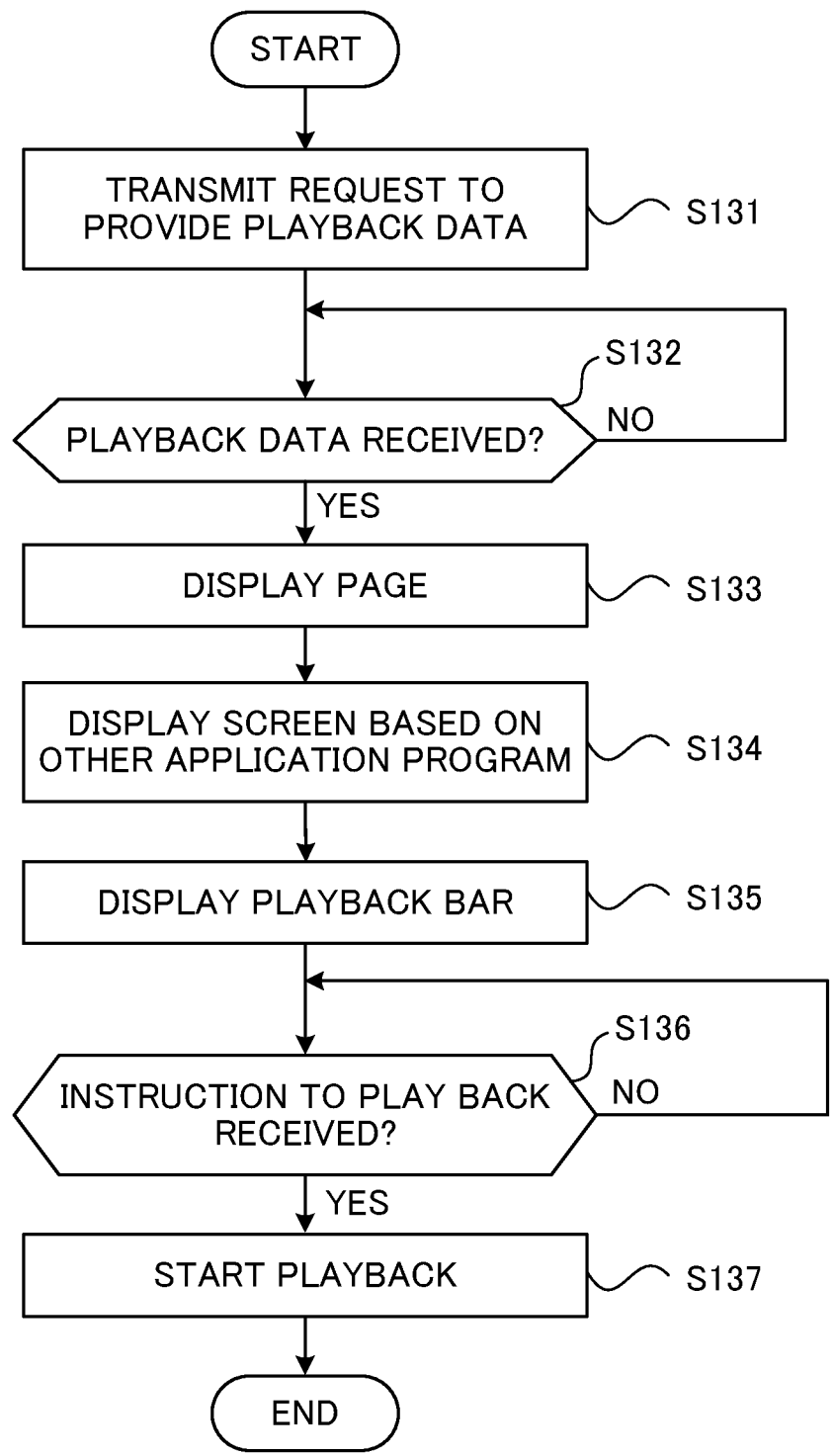
FIG. 18 is a flowchart of an operation performed by the mobile terminal shown in FIG. 2, when the playback data is played back.

FIG. 18 is a flowchart of the operation performed by the mobile terminal 20, when the playback data 50 is played back.

As shown in FIG. 18, the provision requester 28e of the mobile terminal 20 transmits a request to provide the playback data of the page that has been displayed last on the second display unit 22b, in other words the final updated page which is the latest page, to the data management system 40 (S131). In the case of a note that has never been opened, such as a new note, the provision requester 28e regards the first page as the final updated page. The provision request responder 45b of the data management system 40 receives the provision request transmitted at S131 from the mobile terminal 20, and searches the storage unit 44 for the playback data of the page, the provision of which has been requested. At this point, the provision request responder 45b may identify the page accompanied with the latest date and time, among the date bookmark data and the time stamps stored in the storage unit 44, as the final updated page. Upon identifying the playback data of the page, the provision of which has been requested, the provision request responder 45b of the data management system 40 retrieves the date bookmark data, the application event, the handwritten data, the recorded data, and the copy-pasted data, included in the directory of the final updated page from the storage unit 44 as the playback data, and transmits the playback data of the page thus retrieved, to the mobile terminal 20. Here, in the case of a new page on which no writing has been made, no playback data is included in the directory of this page. Therefore, when a request to provide a new page is received, the provision request responder 45b of the data management system 40 transmits empty information (e.g., NULL) to the mobile terminal 20, as the playback data.

Upon completing the operation of S131, the provision requester 28e of the mobile terminal 20 checks whether the playback data has been received from the data management system 40, until the provision requester 28e decides that the playback data has been received from the data management system 40 (S132).

When it is decided at S132 that the playback data has been received from the data management system 40, the playback processor 28f of the mobile terminal 20 uses the note application program 27a to display the page on which the handwritten data and the copy-pasted data, included in the playback data, decided at S132 to have been received from the data management system 40, are fully written (final updated page), on the second display unit 22b (S133). When the playback data decided at S132 to have been received from the data management system 40 is empty, the playback processor 28f displays only a page on which no writing has been made, on the second display unit 22b.

Upon completing the operation of S133, the playback processor 28f of the mobile terminal 20 displays, on the display unit 22, a screen that was displayed last, by an application program other than the note application program 27a, according to the application event included in the playback data, decided at S132 to have been received from the data management system 40 (S134). In other words, the playback processor 28f displays, on the display unit 22, the screen based on another application program, which was previously displayed on the display unit 22 when the writing on the final updated page was finished. For example, the document data and the website, previously displayed on the display unit 22 when the writing on the final updated page was finished, are displayed on the first display unit 22a.

Figure 19:
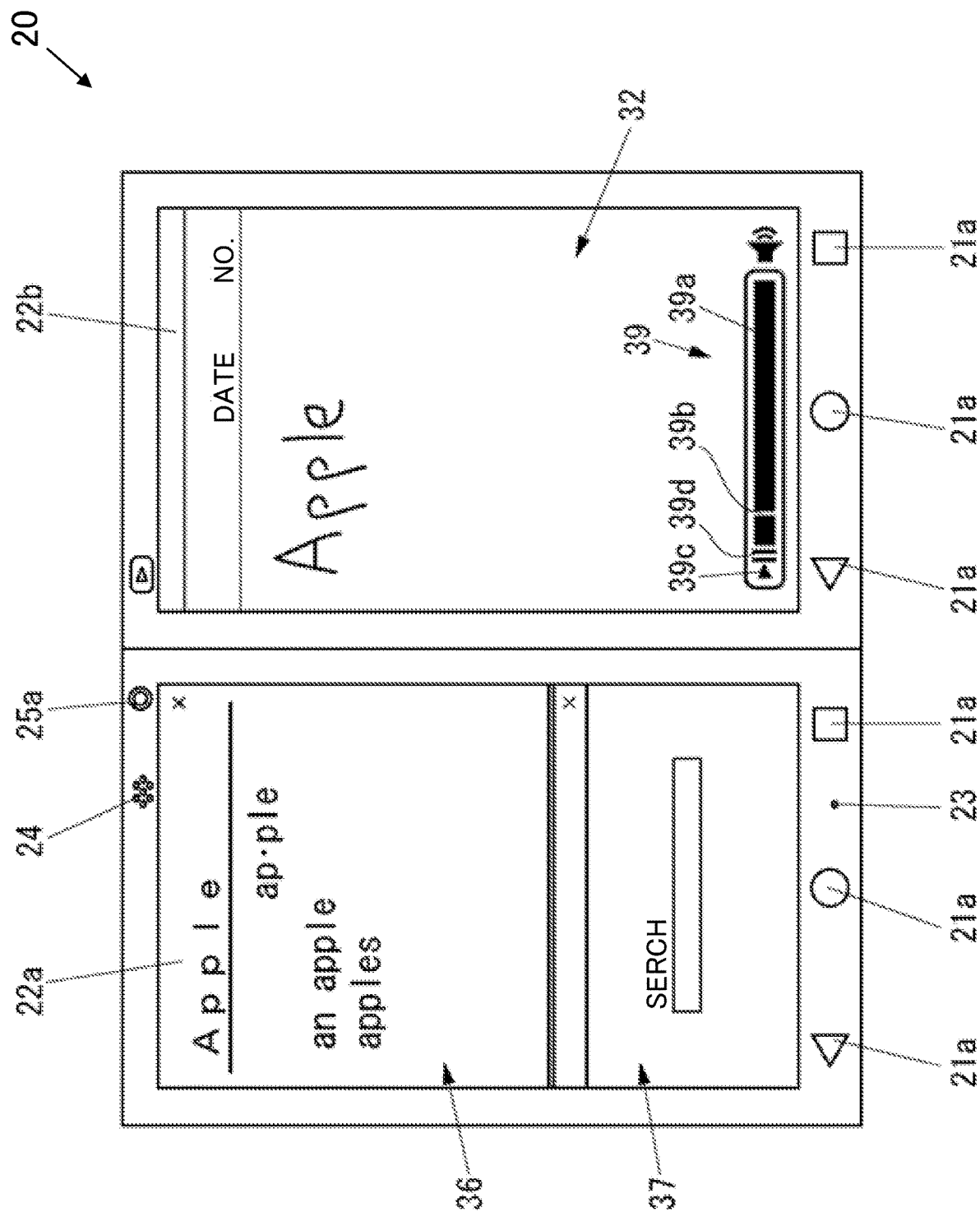
FIG. 19 is a front view of the mobile terminal shown in FIG. 3, in which the playback data is played back.

Upon completing the operation of S134, the playback processor 28f of the mobile terminal 20 displays a playback bar 39 used to play back the playback data, on the second display unit 22b as shown in FIG. 19 (S135). The playback bar 39 includes a playback duration indicator 39a that indicates the time length for playing back the playback data, a playback cursor 39b that indicates a position in the playback duration indicator 39a, and can be slid to a desired position in the playback duration indicator 39a through the operation unit 21, a playback start button 39c for playing back the playback data from the time point corresponding to the position of the playback cursor 39b, and a playback stop button 39d for stopping the playback.

Upon completing the operation of S135, the playback processor 28f of the mobile terminal 20 checks whether the playback bar 39 has received an instruction to start the playback from the playback start button 39*c*, until the playback processor 28*f* decides that the playback bar 39 has received the instruction to start the playback from the playback start button 39*c* (S136).

Upon deciding at S136 that the playback bar 39 has received the instruction to start the playback from the playback start button 39*c*, the playback processor 28*f* of the mobile terminal 20 once erases the display based on the playback data subsequent to a time stamp of the time point corresponding to the position indicated by the playback cursor 39*b*, and sequentially plays back the playback data, from the time stamp of the time point corresponding to the position indicated by the playback cursor 39*b* (S137). In other words, the playback processor 28*f* chronologically plays back the playback data, from the data having a time stamp subsequent and closest to the time point indicated by the playback cursor 39*b*, to the data having the time stamp of the last time point, in the playback data decided at S132 to have been received from the data management system 40. Here, when any of the data written on the page displayed on the second display unit 22*b* is touched, the playback processor 28*f* may play back the playback data, starting from the time stamp of the written data that has been touched.

Figure 20:
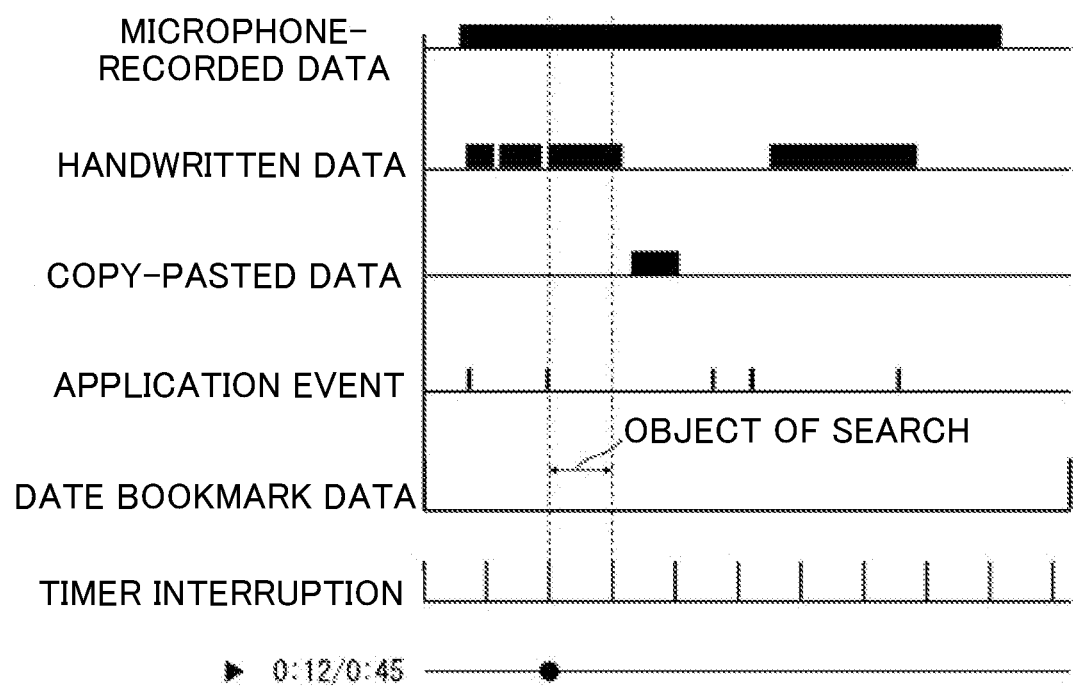
FIG. 20 is a diagram showing the playback data representing the case where a timer interruption is generated while the mobile terminal shown in FIG. 2.

When playing back the playback data at S137, the playback processor 28*f* of the mobile terminal 20 may sequentially acquire the requested playback data from the data management system 40 through the provision requester 28*e*, and play back the data by streaming. For example, as shown in FIG. 20, the playback processor 28*f* may generate timer interruption at predetermined time intervals such as every second during the playback, and transmit a request to provide the playback data having time stamps corresponding to a specific time range, for example from the time corresponding to the timer interruption generated to the time corresponding to the next timer interruption, to the data management system 40 through the provision requester 28*e*, thereby acquiring such playback data from the data management system 40. Upon acquiring the playback data from the data management system 40, the playback processor 28*f* delivers the acquired data corresponding to the mentioned time range, to at least one of the note application 28*g*, the document application 28*h*, the browser application 28*i*, and the phone application 28*j*, to play back the data in synchronization. When the mobile terminal 20 sequentially acquires the playback data from the data management system 40 and plays back the data by streaming, the data amount of the playback data to be received at the time of displaying the final updated page on the second display unit 22*b* can be reduced, and therefore the time before the final updated page is displayed can be shortened.

In the case of the task executed by the browser application program 27*c*, the playback processor 28*f* of the mobile terminal 20 plays back the task executed by the browser application program 27*c* through the browser expander 28*k*.

Although the foregoing description refers to playing back the data of the final updated page, the playback data of pages other than the final updated page can be similarly played back. For example, when an instruction to display the next page or the previous page is inputted through the operation unit 21, after the final updated page is displayed on the second display unit 22*b*, the playback processor 28*f* of the mobile terminal 20 transmits a request to provide the playback data of the page to be newly displayed to the data management system 40, displays the new page on the second display unit 22*b* according to the playback data acquired from the data management system 40, and plays back the playback data corresponding to the new page according to an input made through the operation unit 21.

Hereunder, an operation of the data management system 40, performed when the playback data is transmitted to outside of the information processing system 10, will be described.

When an instruction to transmit the playback data to a specific location outside the information processing system 10 is inputted through the operation unit 41 or the communication unit 43, the data transmitter 45*d* of the data management system 40 transmits the playback data to the designated location. For example, the data transmitter 45*d* may allow an information processing device, for example a given personal computer (PC), to download the playback data. The user can upload the playback data downloaded from the data management system 40, for example to an online storage service such as Google (registered trademark) drive or Dropbox (registered trademark). The user can also utilize the online storage service to share the playback data stored in another online storage service outside the information processing system 10, with another user.

Figure 21:
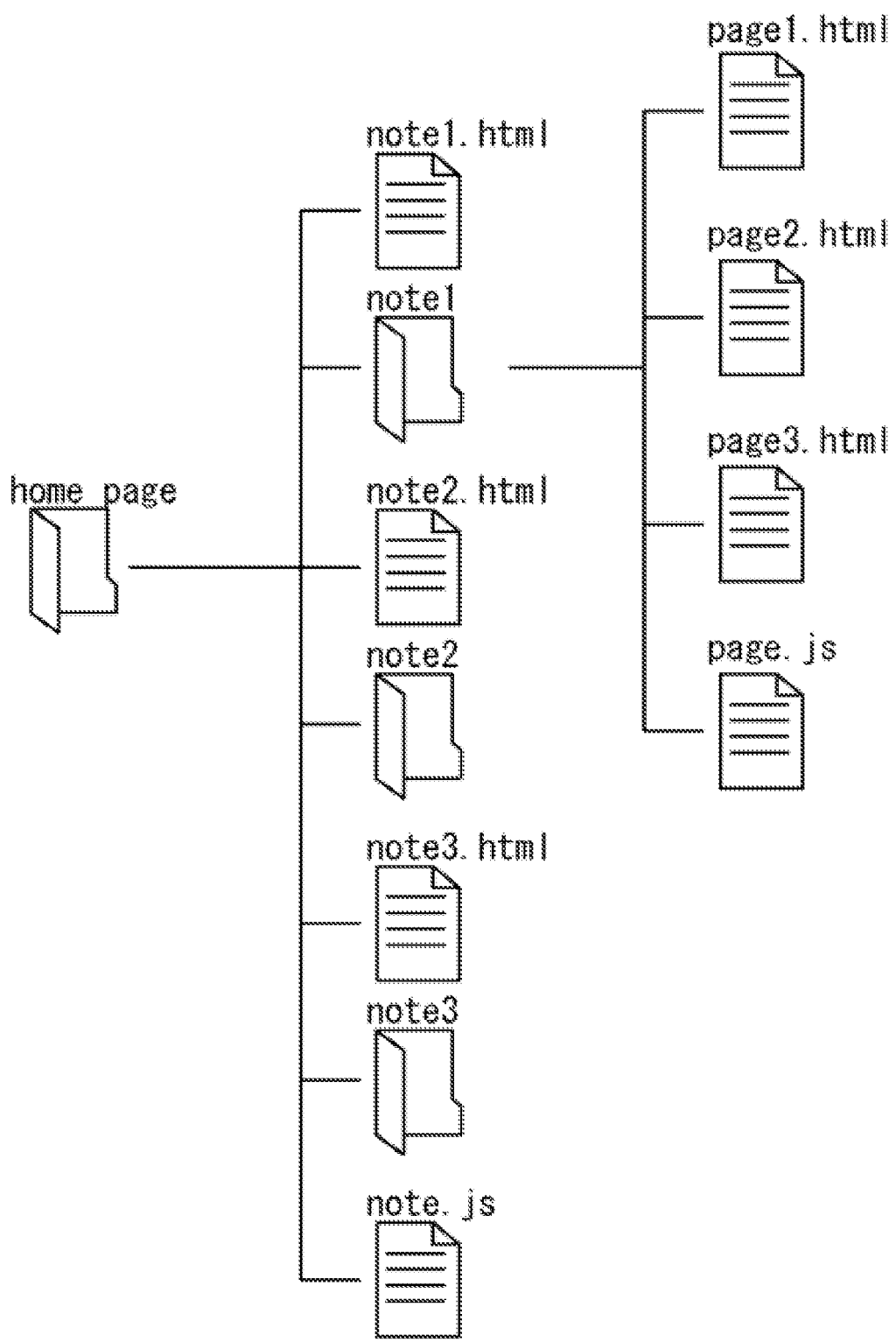
FIG. 21 is a schematic diagram showing a directory structure of the playback data, in an online storage service outside the information processing system shown in FIG. 1.

FIG. 21 illustrates a directory structure of the playback data in the online storage service outside the information processing system 10.

The directory structure shown in FIG. 21 includes the playback data of three notes, namely "note 1", "note 2", and "note 3". The "note 1" includes three pages, namely "page 1", "page 2", and "page 3".

As described above, the playback processor 28*f* of the mobile terminal 20 can use the note application program 27*a* to display a page included in the playback data stored in the data management system 40, on the second display unit 22*b*. Likewise, the playback processor 28*f* can also use the note application program 27*a* to display a page included in the playback data stored outside the information processing system 10, on the second display unit 22*b*. For example, the playback processor 28*f* can use the note application program 27*a* to display a page included in the playback data stored in an online storage service outside the information processing system 10, on the second display unit 22*b*. Here, although the playback data stored in the online storage service outside the information processing system 10 is owned by the user B, the playback processor 28*f* of the mobile terminal 20 to which the user A has logged in can use the note application program 27*a* to display the page included in the playback data on the second display unit 22*b*, in the case where the online storage service is set so as to allow the playback data to be shared with the user A.

As described above, the mobile terminal 20 can copy-paste the writing on a page included in the playback data stored in the data management system 40, to another page. Likewise, the mobile terminal 20 can also copy-paste the writing on a page included in the playback data stored outside the information processing system 10, to another page.

As described above, the mobile terminal 20 can play back the playback data stored in the data management system 40. Likewise, the mobile terminal 20 can also play back the playback data stored outside the information processing system 10.

As described thus far, the information processing system 10 records, as the playback data, the document data and the website, looked up when the writing was made on the page displayed on the mobile terminal 20, as well as the voice data generated by the microphone 23, with a time stamp added thereto, together with the written data in association with the page. Further, when displaying the page on which the writing has been made, the information processing system 10 can acquire the playback data of the page, and play back each of the data included in the playback data acquired, in synchronization according to the time stamp. Therefore, the information processing system 10 can reproduce the writing made on the page of the note, together with the circumstance in which the writing has been made, thereby facilitating the user to understand the content of the writing on the page of the note.

Here, with the technique according to the foregoing background art, although the student takes notes during the class, the writing made by the student on the note is not recorded in association with the recorded information. Therefore, when the student reviews the note while playing back the recorded information together with the content, the student is unable to identify what the writing on the note refers to, thereby failing to understand the writing on the note.

According to the foregoing embodiment, in contrast, a mobile terminal and an information processing system that facilitate the user to understand the writing on the page are provided.

The information processing system 10 can transmit the playback data recorded in the data management system 40 to outside of the information processing system 10, and use the note application 28g to display the page included in the playback data stored outside the information processing system 10 on the second display unit 22b. Therefore, although access to the playback data of anther user is restricted in the data management system 40, the page included in the playback data of the other user, stored outside the information processing system 10, can be displayed on the second display unit 22b, through the note application 28g. In the foregoing embodiment, the information processing system 10 permits, with an authentication key, access from the mobile terminal 20 to the playback data of a user other than the user who has logged in in the mobile terminal 20, among the playback data recorded in the data management system 40. However, the information processing system 10 may restrict the access from the mobile terminal 20 to the playback data of a user other than the user who has logged in in the mobile terminal 20, among the playback data recorded in the data management system 40, to thereby improve the security level of the data management system 40.

When transmitting the playback data stored in the data management system 40 to outside of the information processing system 10, the data management system 40 may transmit the playback data stored in the database 44a to outside of the information processing system 10, instead of transmitting the entity of the data stored in the large-capacity storage unit 44b. In the case where the entity of the data stored in the large-capacity storage unit 44b is kept from being transmitted to outside of the information processing system 10, the playback processor 28f of the mobile terminal 20 utilizes the entity of the data stored in the large-capacity storage unit 44b, when using the note application 28g to display a page included in the playback data stored outside the information processing system 10, on the second display unit 22b. The information processing system 10 utilizes the entity of the data stored in the large-capacity storage unit 44b of the data management system 40, when transmitting the playback data stored in the database 44a of the data management system 40 to outside of the information processing system 10, instead of transmitting the entity of the data stored in the large-capacity storage unit 44b, and using the note application 28g to display the page included in the playback data stored outside the information processing system 10 on the second display unit 22b. Therefore, the burden imposed on the system outside the information processing system 10 can be alleviated, despite the size of the entity of the data being large.

The mobile terminal 20 acquires the task executed by the browser application program 27c through the browser expander 28k, and plays back the task executed by the browser application program 27c through the browser expander 28k. Therefore, the task executed by the browser application program 27c can be recorded and played back by utilizing the browser expander 28k, despite the manufacturer of the mobile terminal 20 and the manufacturer of the browser application program 27c being different.

In the foregoing embodiment, the display unit 22 of the mobile terminal 20 is composed of two pieces of hardware, namely the first display unit 22a and the second display unit 22b. However, the mobile terminal 20 may include the display unit constituted of a single piece of hardware, but divided by software into two display units, namely the first display unit 22a and the second display unit 22b.

The configurations and arrangements according to the foregoing embodiment, described with reference to FIG. 1 to FIG. 21, are merely exemplary, and in no way intended to limit the disclosure to those configurations and arrangements.

While the present disclosure has been described in detail with reference to the embodiments thereof, it would be apparent to those skilled in the art the various changes and modifications may be made therein within the scope defined by the appended claims.

What is claimed is:

1. An information processing system comprising:
a mobile terminal; and
a data management system connected to the mobile terminal via a network,
wherein the mobile terminal includes:
a display device displaying pages of a note; and
a control unit including a CPU, and configured to act, when the CPU executes a program, as:
an input receiver that receives a writing made on the page, displayed on the display device;
an application executor that executes an application program;
a note application realized when the application executor executes a note application program, being the application program configured to cause the display device to display the page and enable writing on the page;
a recording requester that requests the data management system to record playback data, including the written data received by the input receiver and a task executed by the browser application program, with a time stamp added to the written data and the executed task; and
a playback processor that plays back the written data and the executed task included in the playback data acquired from the data management system, in synchronization according to the time stamp,
the data management system includes a data transmitter that transmits the playback data recorded in the data management system to outside of the information processing system, and
the playback processor displays the page based on the playback data stored outside the information processing system on the display device, using the note application, wherein the data management system includes:
a database for storing at least a part of the playback data, with respect each note; and
a storage unit for storing an entity of at least a part of the playback data stored in the database,
the data transmitter transmits the playback data stored in the database to outside of the information processing system, instead of transmitting the entity stored in the storage unit to outside of the information processing system, and
the playback processor utilizes the entity stored in the storage unit, when displaying the page based on the playback data stored outside the information processing system on the display device, using the note application.

* * * * *